United States Patent
Osada et al.

(10) Patent No.: US 9,982,784 B2
(45) Date of Patent: May 29, 2018

(54) MECHANICAL SEAL

(75) Inventors: Haruhiro Osada, Tokyo (JP); Hideyuki Inoue, Tokyo (JP); Takeshi Hosoe, Tokyo (JP); Daisuke Morimiya, Tokyo (JP); Yuichiro Tokunaga, Tokyo (JP); Yuta Negishi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days. days.

(21) Appl. No.: 14/234,200

(22) PCT Filed: Jul. 27, 2012

(86) PCT No.: PCT/JP2012/069144
§ 371 (c)(1),
(2), (4) Date: Jan. 22, 2014

(87) PCT Pub. No.: WO2013/021839
PCT Pub. Date: Feb. 14, 2013

(65) Prior Publication Data
US 2014/0167361 A1    Jun. 19, 2014

(30) Foreign Application Priority Data
Aug. 5, 2011 (JP) ................................ 2011-171414

(51) Int. Cl.
*F16J 15/34*    (2006.01)

(52) U.S. Cl.
CPC ........... *F16J 15/34* (2013.01); *F16J 15/3412* (2013.01)

(58) Field of Classification Search
CPC ...... F16J 15/34; F16J 15/3412; F16J 15/3244; F16J 15/40; F16J 15/441
(Continued)

(56) References Cited

U.S. PATENT DOCUMENTS 5,222,743 A * 6/1993 Goldswain et al. .......... 277/400
5,312,117 A * 5/1994 Takenaka ............. F16J 15/3412
                                                         277/400
(Continued)

FOREIGN PATENT DOCUMENTS

JP    S61-184165 U    11/1986
JP    S63-118460 U    7/1988
(Continued)

OTHER PUBLICATIONS

An Office Action issued by the Korean Patent Office, dated Aug. 6, 2014, for Korean counterpart application No. 10-2013-7030778.
(Continued)

*Primary Examiner* — Nathan Cumar
(74) *Attorney, Agent, or Firm* — Hayes Soloway P.C.

(57) ABSTRACT

A mechanical seal has a structure wherein a plurality of sealed-fluid-accommodating blocks separated in the circumferential direction are formed on either the sealing face of a fixed ring or the sealing face of a rotating ring so as to communicate with a sealed fluid accommodation space. Pumping parts for creating a pumping action due to the fixed ring and the rotating ring sliding while undergoing relative rotation are formed on a bottom part of the plurality of sealed-fluid-accommodating blocks. The pumping parts formed on the bottom parts of the plurality of sealed-fluid-accommodating blocks are provided with an intake pumping part which acts in a direction in which the sealed fluid is drawn in and a discharge pumping part which acts in a direction in which the sealed fluid is discharged.

19 Claims, 16 Drawing Sheets

(58) Field of Classification Search
USPC .................. 277/306, 400, 345, 348, 358
See application file for complete search history.

(56) References Cited

U.S. PATENT DOCUMENTS

| | | | | |
|---|---|---|---|---|
| 5,501,470 | A | * | 3/1996 | Fuse et al. .................. 277/400 |
| 5,529,317 | A | * | 6/1996 | Muller .................. F16J 15/3404 |
| | | | | 277/400 |
| 5,529,318 | A | * | 6/1996 | Fuse .................. F16J 15/3412 |
| | | | | 277/400 |
| 5,533,739 | A | * | 7/1996 | Sedy .................. F16J 15/3472 |
| | | | | 277/390 |
| 2011/0101616 | A1 | | 5/2011 | Teshima et al. |

FOREIGN PATENT DOCUMENTS

| | | | |
|---|---|---|---|
| JP | H01-133572 U | | 9/1989 |
| JP | H04-000073 A | | 1/1992 |
| JP | H07-035242 A | | 2/1995 |
| JP | 2004-183810 A | | 7/2004 |
| JP | 2007-069300 A | | 3/2007 |
| JP | 2009-014183 A | | 1/2009 |
| JP | 2009 014183wT | * | 1/2009 |
| JP | 2009 14183wT | * | 1/2009 |
| JP | 2009-250378 A | | 10/2009 |
| WO | 2009/087995 A1 | | 7/2009 |

OTHER PUBLICATIONS

International Search Report (ISR) dated Sep. 4, 2012, issued for International application No. PCT/JP2012/069144.

Notification of Transmittal of Translation of the International Preliminary Report on Patentability (PCT/IB/338) dated Feb. 20, 2014, with International Preliminary Report on Patentability (PCT/IB/373) and Written Opinion of the International Searching Authority (PCT/ISA/237), for corresponding international application PCT/JP2012/069144.

A Notification of Reasons for Refusal issued by the State Intellectual Property Office of China, dated Mar. 13, 2015, for Chinese counterpart application No. 201280031364.5.

A Second Notification of Reasons for Refusal issued by the State Intellectual Property Office of China, dated Nov. 5, 2015, for Chinese counterpart application No. 201280031364.5.

* cited by examiner

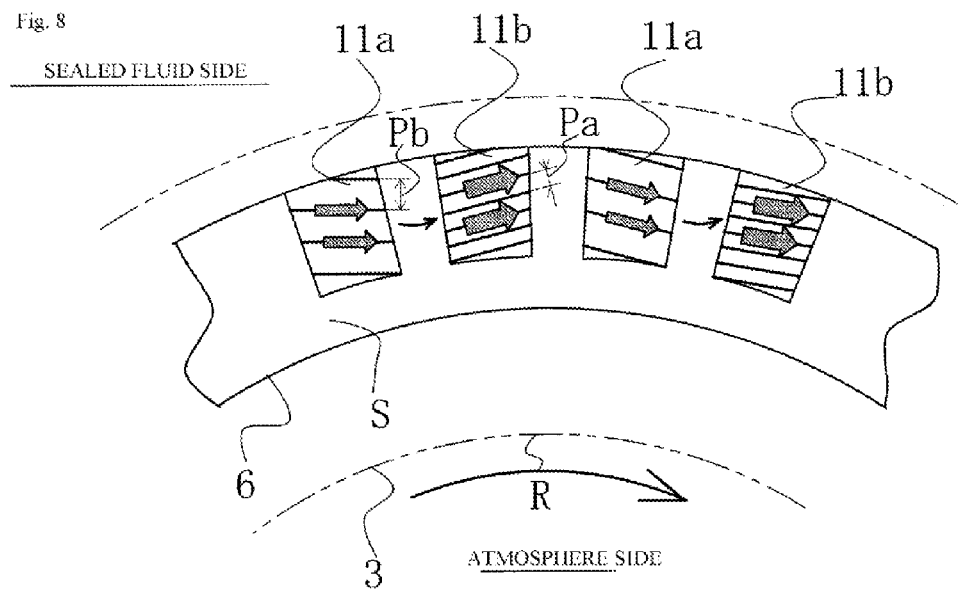
(a)
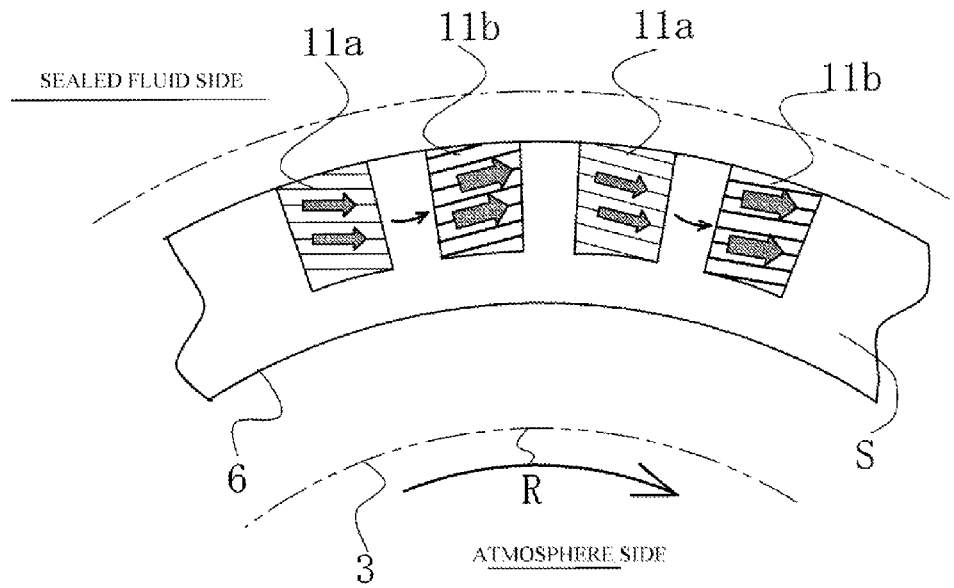
(b)

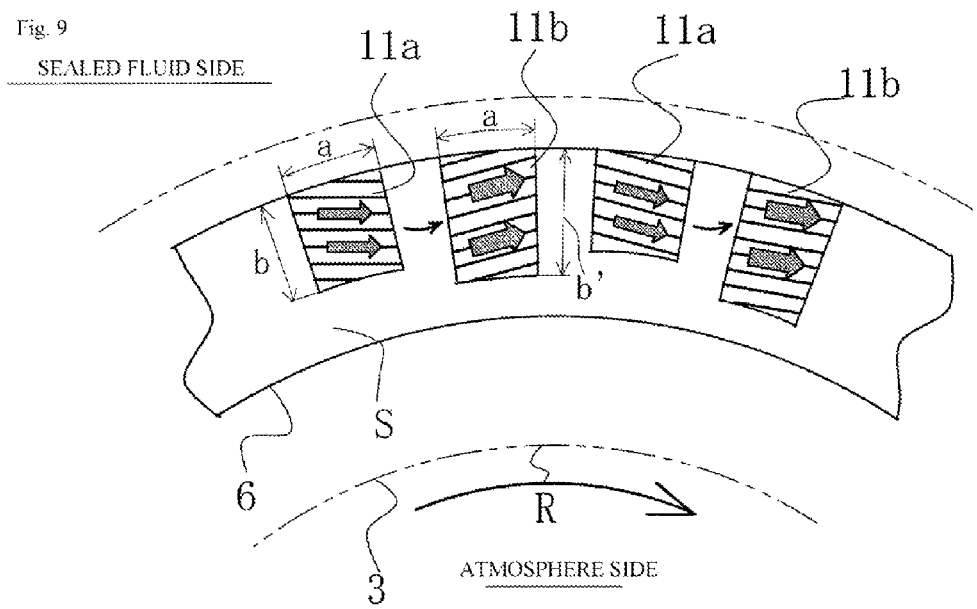
(a)
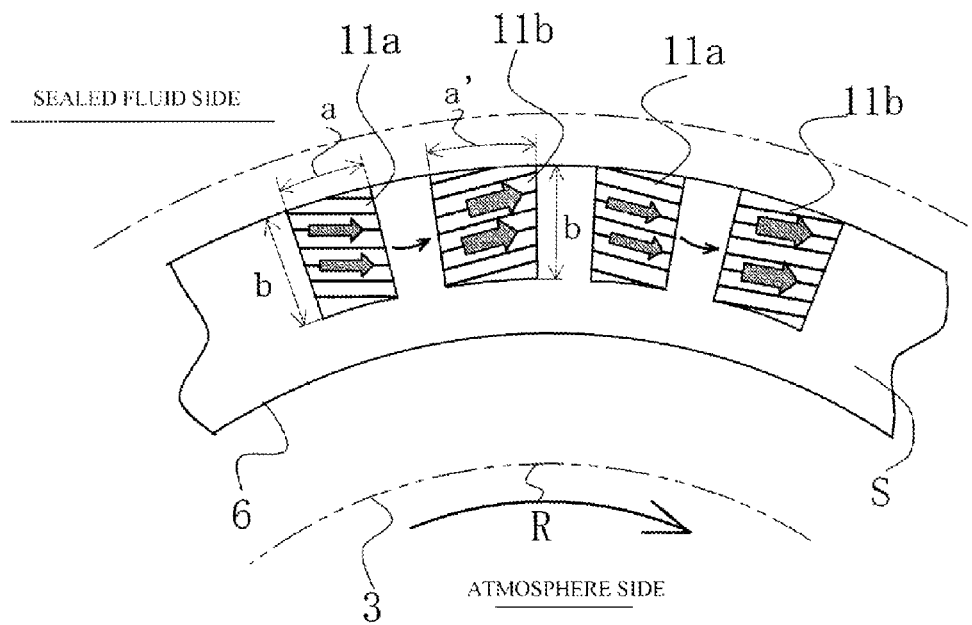
(b)

Fig. 12
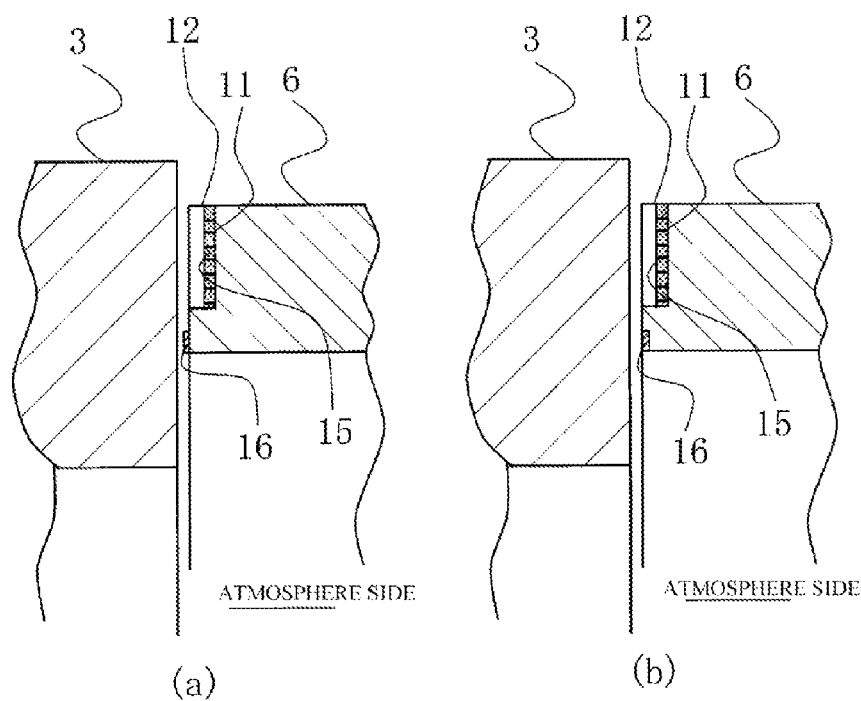
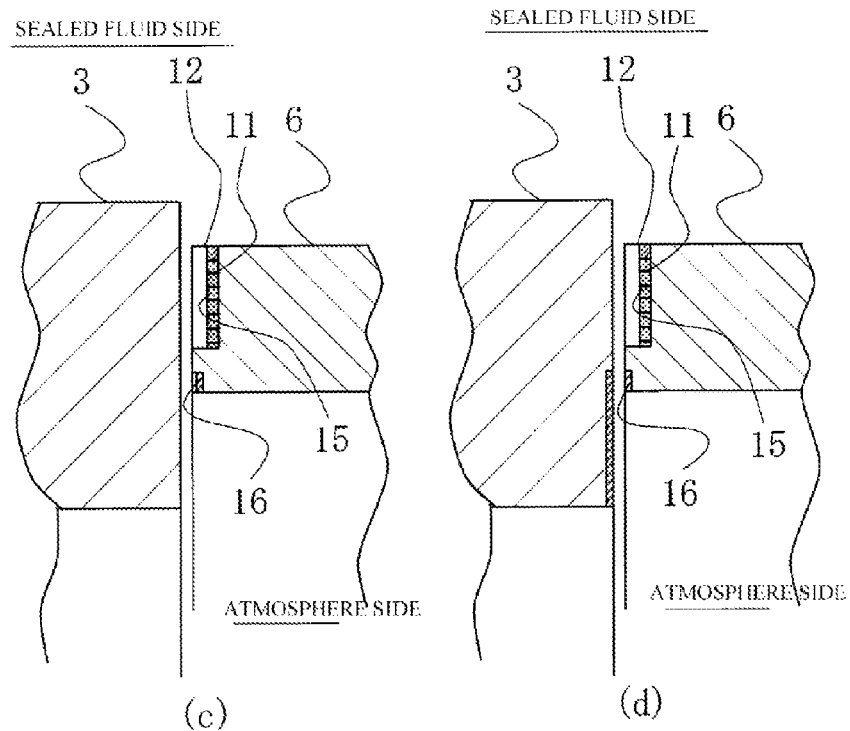

Fig. 13
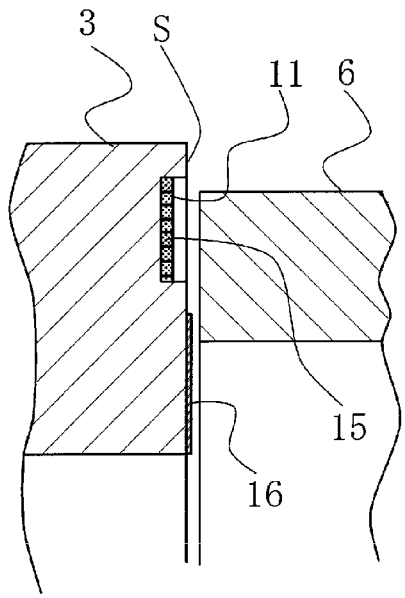
(a) 
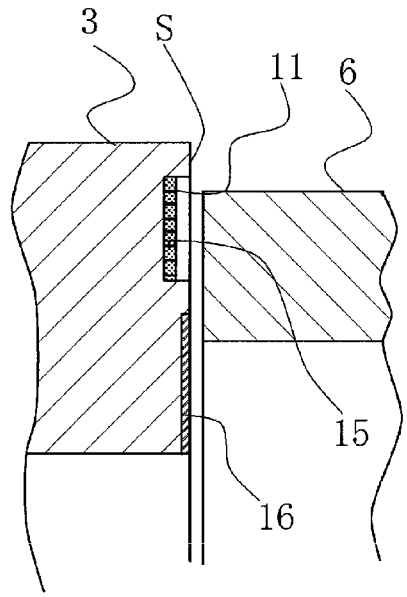
(b)
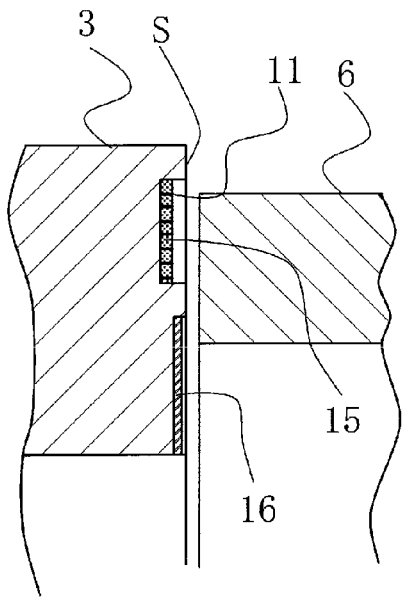
(c)
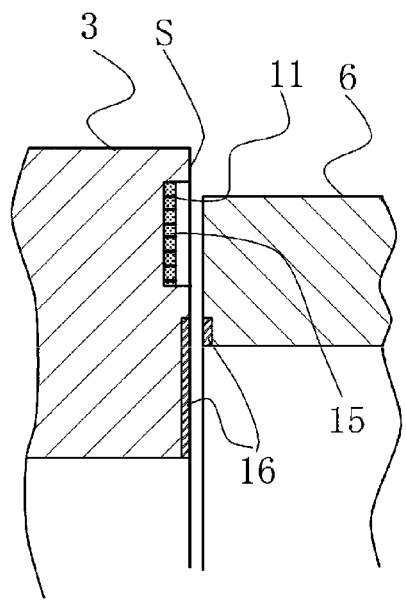
(d)

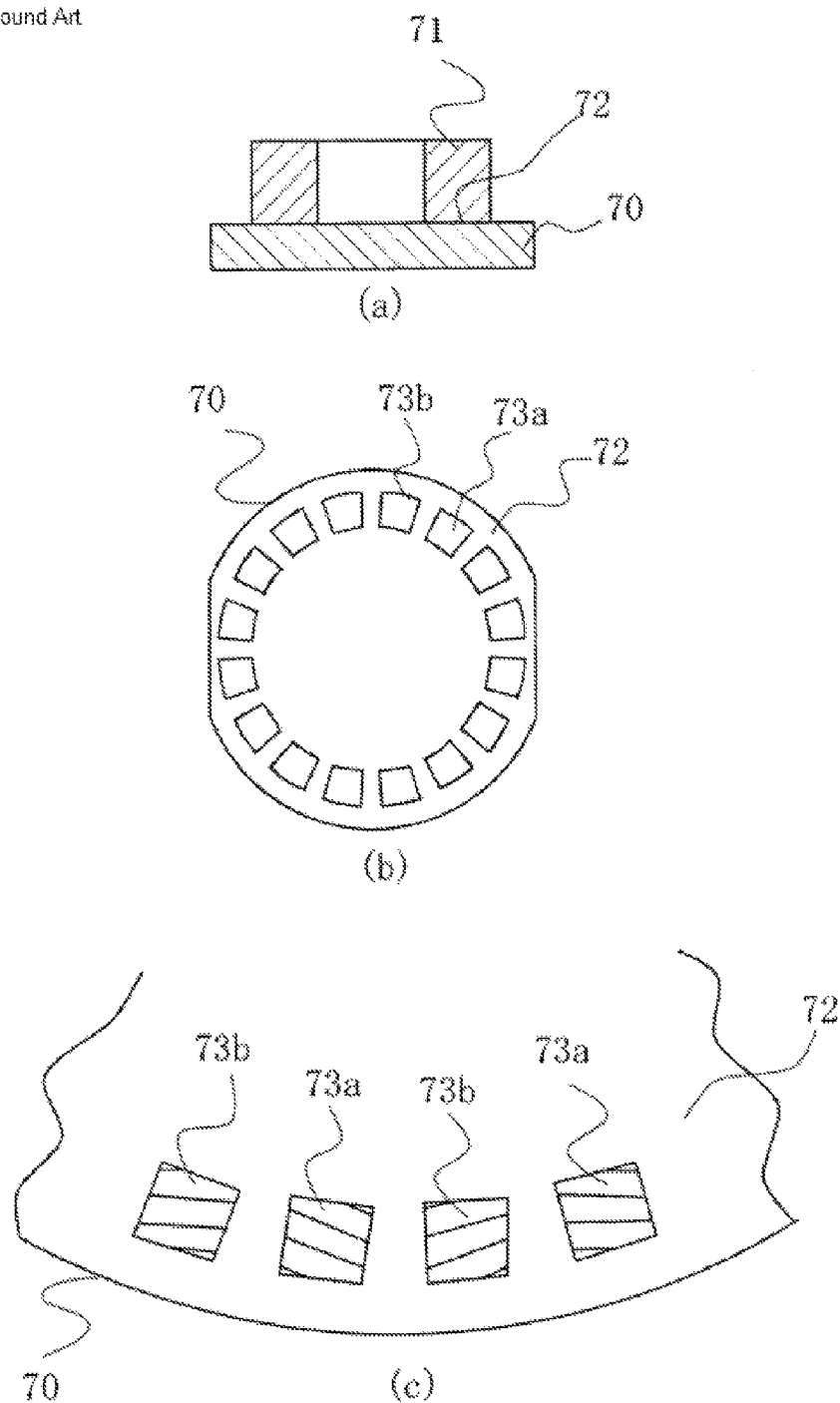

MECHANICAL SEAL

This application is the U.S. National Phase under 35 U.S.C. § 371 of International Application PCT/JP2012/069144, filed Jul. 27, 2012, which claims priority to Japanese Patent Application No. 2011-171414, filed Aug. 5, 2011. The International Application was published under PCT Article 21(2) in a language other than English.

TECHNICAL FIELD

The present invention relates to a mechanical seal used in automobiles, general industrial machinery, and other fields requiring seals; e.g., a mechanical seal used for sealing in a rotating shaft and housing for a water pump.

BACKGROUND ART

In order to maintain prolonged sealing performance in a mechanical seal, it is necessary to achieve the contradictory conditions of airtightness and lubricity. In recent years especially, there has been an even greater demand for lower friction in order to reduce mechanical loss while also preventing leakage of a sealed fluid, in part because of environmental measures. Friction can be reduced by achieving a "fluid-lubrication state," in which rotation creates dynamic pressure between sealing faces and the faces slide with a liquid film interposed therebetween. However, in such a case, positive pressure occurs between the sealing faces, and therefore the fluid flows out from the positive pressure portion to the outside of the sealing face. This outward flow of fluid qualifies as leakage in cases of sealing.

The present applicants, having made improvements to the manner in which a sealed fluid is introduced between sealing faces and is held there, have previously filed for a patent for the invention of a mechanical seal sliding member for obtaining stable and favorable lubrication performance, i.e., for causing sealing faces where a stationary sliding member and a rotating sliding member face each other to rotate and slide in a relative fashion and for sealing in a sealed fluid present on one side, in the radial direction, of the sealing faces rotating and sliding in a relative fashion in order to lower the coefficient of friction without creating excess leakage. In this configuration, there are formed, spaced apart on the sealing faces, a plurality of grating parts where a plurality of rectilinear irregularities in parallel with each other are formed at a predetermined pitch in a predetermined section, the rectilinear irregularities of the plurality of grating parts being formed so that the direction of the irregularities is sloped at a predetermined angle with respect to the sliding direction of the sealing faces ("Prior Art 1;" see Patent Citation 1).

Also known is an invention of a low-friction sealing face having a grating-like periodic structure formed in a plurality of discrete regions of a mirror surface portion forming a solid material surface, all of the regions being sectioned with the entire periphery thereof surrounded by the mirror surface portion and the mirror surface portion being one continuous surface, the objective of the invention being to provide a sealing face structure having excellent reciprocating sliding properties in a stopped state ("Prior Art 2;" see Patent Citation 2).

Further known is an invention of a sealing face structure in which a sealing face of a first member and a sealing face of a second member slide in a relative fashion in the presence of a lubricant. In this configuration, a plurality of grating parts comprising a plurality of irregularities are formed along the sliding direction on the sealing face of the first member and/or the second member and the direction of a periodic structure of grating parts adjacent along the sliding direction is symmetrical with respect to the sliding direction. An objective of this invention is to provide a sealing face structure whereby low friction can be achieved and familiar steps can be shortened ("Prior Art 3;" see Patent Citation 3).

However, as is illustrated in FIG. 14, Prior Art 1 does not state that the grating parts 50, being formed in a range between radii R2 and R3 of the sealing face 51 of an inner radius R1 and an outer radius R4, communicate with the sealed fluid side, and thus the grating parts 50 are not intended to actively keep catching the sealed fluid at the start-up of the mechanical seal, nor is the amount of sealed fluid caught by the grating parts 50 adequate after start-up. The amount of sealed fluid caught by the grating parts during start-up and after start-up will also have been limited, because the grating parts 50 are formed substantially flush with the sealing face 51.

Also, in Prior Art 2 as illustrated in FIG. 15, the plurality of grating-like periodic structure parts 60 are sectioned, with the entire periphery thereof surrounded by the mirror surface portion 61, and do not communicate with the outside of the zones of the mirror surface portion 61; therefore, because the grating-like periodic structure parts 60 are covered by the opposing sliding members in the case of application to a mechanical seal and do not communicate with the sealed fluid side, the grating-like periodic structure parts 60 will be unable to catch the sealed fluid present outside of the zones of the mirror surface portion 61 during start-up of the mechanical seal, nor can the amount of sealed fluid caught by the grating-like periodic structure parts 60 be adequate after start-up. Further, when the grating-like periodic structure parts 60 are formed at a point deeper than the mirror surface portion 61, although the amount of oil film that can be held increases, there is a decline in the efficacy of lateral leakage prevention by the periodic structure parts 60 during sliding, indicating that the grating-like periodic structure parts cannot be too deep.

In summary, Prior Art 2 makes no implication of use as a mechanical seal, and even with hypothetical use as a mechanical seal, discloses no technical idea whereby the sealed fluid would be actively caught by the grating-like periodic structure parts 60 during start-up of the mechanical seal and would be prevented from leaking out to the atmosphere side.

Prior Art 3, as illustrated in FIG. 16A, is a bearing or other sealing face structure in which a sealing face of a disc body 70 and a sealing face of a ring body 71 slide in a relative fashion in the presence of a lubricant. As illustrated in FIG. 16B, there are formed along the sliding direction on the sealing face 72 of the disc body 70 a plurality of grating parts 73a, 73b which are sectioned with the entire periphery thereof surrounded by the sealing face 72 and comprise a plurality of irregularities. As illustrated in FIG. 16C, the directions of periodic structures of grating parts 73a, 73b that are adjacent in the sliding direction are rendered symmetrical with respect to the sliding direction. However, the manner of application to any sealing face other than a bearing is not disclosed; even with hypothetical application to a mechanical seal, there is no indication that the grating parts 73a, 73b of the sealing face 72 of the disc body 70 communicate with the sealed fluid side. Therefore, no disclosure is made of a technical idea whereby the grating parts 73a, 73b would actively catch the sealed fluid during start-up and after start-up of the mechanical seal. Additionally, since the grating parts 73*a*, 73*b* are formed substantially flush with the sealing face 72, a problem emerges in that the grating parts 73*a*, 73*b* are unable to catch the sealed fluid, and in that the sealing faces cannot be adequately lubricated during start-up and after start-up.

CITATION LIST

Patent Literature

Patent Citation 1: Domestic Re-publication of PCT International Application No. WO/2009/087995
Patent Citation 2: Japanese Laid-open Patent Publication 2007-69300
Patent Citation 3: Japanese Laid-open Patent Publication 2009-14183

SUMMARY OF INVENTION

Technical Problem

The present invention has been contrived to resolve the problems of the prior art, it being an objective thereof to provide a mechanical seal which will not leak when stationary; which operates using fluid lubrication and prevents leakage during rotation, including at the start of rotation; and which enables airtightness and lubricity to be exhibited.

Solution to Problem

In order to achieve the foregoing objective, a first aspect of the mechanical seal of the present invention is a mechanical seal in which a stationary ring fixed to a fixed side and an annular rotating ring rotating together with a rotating shaft face each other, and sealing faces are made to perform relative rotation, thereby sealing in a sealed fluid present on one side in the radial direction of said sealing faces that slide while undergoing the relative rotation, the mechanical seal being characterized in that:

a plurality of sealed-fluid-accommodating blocks separated in the circumferential direction are formed on either the sealing face of said fixed ring or the sealing face of said rotating ring so as to communicate with a sealed fluid accommodation space;

pumping parts for creating a pumping action due to the fixed ring and the rotating ring sliding while undergoing relative rotation are formed on a bottom part of said plurality of sealed-fluid-accommodating blocks; and the pumping parts formed on the bottom part of said plurality of sealed-fluid-accommodating blocks are provided with an intake pumping part which acts in a direction in which the sealed fluid is drawn in and a discharge pumping part which acts in a direction in which the sealed fluid is discharged.

According to this aspect, when stationary, there will be a solid contact state between the sealing faces of the fixed ring and the rotating ring, and therefore leakage is prevented by the sealing faces, which are continuous in the circumferential direction, and sealing performance is thereby maintained; also, during start-up, the catching of the sealed fluid in the spaces within the sealed-fluid-accommodating blocks makes it possible to quickly form a lubricating fluid film, and lower the sliding torque of the sealing faces and to reduce friction. Also, during operation, the sealed fluid will be caught in the sealed-fluid-accommodating blocks provided with the intake pumping parts, the sealed fluid will be sent in through the sealing faces to the discharge pumping parts located at positions separated apart by the sealing faces, and the sealed fluid will be returned to the sealed fluid side, whereby it is possible to ensure lubrication performance of the sealing faces and prevent leakage while maintaining sealing performance.

A second aspect of the mechanical seal of the present invention relates to the first aspect, characterized in that in a case where the sealed-fluid-accommodating blocks are provided to whichever of the sealing faces of said fixed ring and said rotating ring that has a lesser width in the radial direction, then the sealed-fluid-accommodating blocks are formed so as to be a part of the sealing face in the radial direction and so as to communicate directly with the sealed fluid accommodation space via an outer peripheral side or an inner peripheral side.

A third aspect of the mechanical seal of the present invention relates to the first aspect, characterized in that in a case where the sealed-fluid-accommodating blocks are provided to whichever sealing face of the sealing faces of the fixed ring and the rotating ring has a greater width in the radial direction, then the sealed-fluid-accommodating blocks are formed on a part of the sealing face that does not include the radial outward and inward sides thereof, and are formed so that a part of the sealed-fluid-accommodating blocks on the sealed fluid side is not covered by the opposing sealing face.

According to the second and third aspects, the sealed fluid will be caught by the sealed-fluid-accommodating blocks; alternatively, the sealed fluid can easily be returned to the sealed fluid side from the sealed-fluid-accommodating blocks.

A fourth aspect of the mechanical seal of the present invention relates to any of the first through third aspects, characterized in that the pumping parts form a periodic structure of linear irregularities and the linear irregularities are formed so that the direction of the irregularities is sloped by a predetermined angle with respect to the sliding direction of the sealing face.

According to this aspect, a desired pumping action can be obtained with the periodic structure of linear irregularities, and thus the pumping parts can be easily formed.

A fifth aspect of the mechanical seal of the present invention relates to any of the first through fourth aspects, characterized in that the pumping parts formed on a bottom part of the plurality of sealed-fluid-accommodating blocks are formed so that the directions of the linear irregularities of adjacent sealed-fluid-accommodating blocks are symmetrical with respect to the sliding direction of the sealing face.

According to this aspect, the present invention is suitable for cases where the sealing face rotates in both the front and reverse directions.

A sixth aspect of the mechanical seal of the present invention relates to any of the first through fifth aspects, characterized in that the sealed-fluid-accommodating blocks and the periodic structure of linear irregularities of the pumping parts are formed by irradiation with a picosecond or femtosecond laser.

According to this aspect, the directionality thereof can be controlled and the processing position can also be controlled; therefore, small, discrete sections can be divided and a desired periodic structure can be formed in each section.

A seventh aspect relates to any of the first through fifth aspects, characterized in that the sealed-fluid-accommodating blocks and the periodic structure of linear irregularities of the pumping parts are formed by stamping or imprinting.

According to this aspect, the periodic structure of linear irregularities can be efficiently achieved.

An eighth aspect of the mechanical seal of the present invention relates to any of the first through fifth aspects, characterized in that the sealed-fluid-accommodating blocks are formed by etching, and the periodic structure of linear irregularities of the pumping parts is formed by irradiation with a picosecond or femtosecond laser.

A ninth aspect of the mechanical seal of the present invention relates to any of the first through fifth aspects, characterized in that the sealed-fluid-accommodating blocks are formed by plating or film-formation, and the periodic structure of linear irregularities of the pumping parts is formed by irradiation with a picosecond or femtosecond laser.

According to the eighth and ninth aspects, the sealed-fluid-accommodating blocks and the periodic structure of linear irregularities can be formed with flexibility by means suited to the manufacturing equipment.

A tenth aspect of the mechanical seal of the present invention relates to any of the first through eighth aspects, characterized in that in a case where the liquid film thickness formed between the sealing faces of the fixed ring and the rotating ring is h, then the depth d1 of a virtual plane linking the vertices of the irregularities of the pumping parts, from the sealing faces, is set so that d1 is 0.1 h to 10 h, and the depth d2 of the irregularities of the pumping parts is set so that d2 is 0.1 h to 10 h.

According to this aspect, ideal pumping parts in accordance with the liquid film thickness can be obtained.

An eleventh aspect of the mechanical seal of the present invention relates to any of the first through tenth aspects, characterized in that the linear irregularities on the intake pumping parts and the discharge pumping parts are formed respectively sloped as desired in the circumferential direction and/or the radial direction in a side view.

A twelfth aspect of the mechanical seal of the present invention relates to the eleventh aspect, characterized in that the intake pumping parts are formed so that the linear irregularities become gradually higher toward the direction of rotation of the opposing sliding member in side view, and the discharge pumping parts are formed so that the linear irregularities become gradually lower toward the direction of rotation of the opposing sliding member in side view.

A thirteenth aspect of the mechanical seal of the present invention relates to either the eleventh or twelfth aspect, characterized in that the intake pumping parts are formed so that the linear irregularities become gradually lower toward the inner peripheral direction in side view, and the discharge pumping parts are formed so that the linear irregularities become gradually lower toward the outer peripheral direction in side view.

According to the eleventh through thirteenth aspects, it is even further possible in the intake pumping parts for the sealed fluid to be caught and sent to the discharge pumping parts, and it is even further possible in the discharge pumping parts for the sealed fluid sent therein to be returned to the sealed fluid side.

A fourteenth aspect of the mechanical seal of the present invention relates to any of the fourth through thirteenth aspects, characterized in that in the pumping parts formed on the bottom part of the plurality of sealed-fluid-accommodating blocks, the pumping capacity of the intake pumping parts and the pumping capacity of the discharge pumping parts are set to be equal, or the pumping capacity of either one is set so as to be greater than the other.

A fifteenth aspect of the mechanical seal of the present invention relates to any of the fourth through fourteenth aspects, characterized in that in the pumping parts formed on the bottom part of the plurality of sealed-fluid-accommodating blocks, the pitch of the linear irregularities of the discharge pumping parts is formed to be smaller than the pitch of the linear irregularities of the intake pumping parts.

A sixteenth aspect of the mechanical seal of the present invention relates to any of the fourth through fifteenth aspects, characterized in that in the pumping parts formed on the bottom part of the plurality of sealed-fluid-accommodating blocks, the width or depth of the linear irregularities of the discharge pumping parts is formed to be greater than the width or depth of the linear irregularities of the intake pumping parts.

A seventeenth aspect of the mechanical seal of the present invention relates to any of the first through sixteenth aspects, characterized in that in the pumping parts formed on the bottom part of the plurality of sealed-fluid-accommodating blocks, the length of the discharge pumping parts in the radial direction or the length of the discharge pumping parts in the circumferential direction is formed to be greater than the length of the intake pumping parts in the radial direction or the length of the intake pumping parts in the circumferential direction.

According to the fourteenth aspect, because the pumping capacity of the intake pumping parts and the pumping capacity of the discharge pumping parts can be set to be equal or the pumping capacity of either one can be set to be greater, the intake or discharge pumping capacity can be freely set in accordance with the mode of use of the mechanical seal.

Also, according to the fifteenth through seventeenth aspects, because the discharge capacity of the discharge pumping parts can be set to be greater than the intake capacity of the intake pumping parts, the sealed fluid flowing in from the intake pumping parts and is returned to the sealed fluid side from the discharge pumping parts and is prevented from leaking out to the atmosphere side.

An eighteenth aspect of the mechanical seal of the present invention relates to any of the first through seventeenth aspects, characterized in that a hydrophilization treatment is carried out on the pumping parts formed on the bottom part of the plurality of sealed-fluid-accommodating blocks.

According to this aspect, the sealed fluid can be more readily introduced to the pumping parts, and an antifouling effect is exhibited. Furthermore, providing a hydrophilic coating to the pumping parts and preventing the occurrence of sediment matter leads to the prevention of leakage.

A nineteenth aspect of the mechanical seal of the present invention relates to any of the first through eighteenth aspects, characterized in that of the sliding parts on the atmosphere side of the sealing faces of the fixed ring and the rotating ring, a water-repellency treatment is carried out at least on the sliding part on the atmosphere side of the sealing face where the pumping parts are formed.

According to this aspect, it is even further possible to prevent the sealed fluid from leaking out to the atmosphere side.

Advantageous Effects of Invention

The present invention exhibits the following superior effects.

(1) According to the first through fifth aspects, when stationary, there will be a solid contact state between the sealing faces of the fixed ring and the rotating ring, and therefore leakage is prevented by the sealing faces, which are continuous in the circumferential direction, and sealing performance is thereby maintained. Also, during start-up, the catching of the sealed fluid in the spaces within the sealed-fluid-accommodating blocks makes it possible to quickly form a lubrication fluid film, and lower the sliding torque of the sealing faces and to reduce friction. During operation, the sealed fluid will be caught in the sealed-fluid-accommodating blocks provided with the intake pumping parts, the sealed fluid will be sent in through the sealing faces to the discharge pumping parts located at positions separated apart by the sealing faces, and the sealed fluid will be returned to the sealed fluid side, making it possible to ensure lubrication performance of the sealing faces and possible to prevent leakage and maintain sealing performance.

(2) According to the sixth through ninth aspects, the periodic structure of linear irregularities of the pumping parts can be easily and accurately provided.

(3) According to the tenth aspect, the effect of (1) above can be optimized.

(4) According to the eleventh through thirteenth aspects, it is even further possible in the intake pumping parts for the sealed fluid to be caught and sent to the discharge pumping parts, and even further possible in the discharge pumping parts for the sealed fluid sent therein to be returned to the sealed fluid side, and thus sealing performance and lubrication performance can be even further enhanced.

(5) According to the fourteenth aspect, because the pumping capacity of the intake pumping parts and the pumping capacity of the discharge pumping parts can be set to be equal or the pumping capacity of either one can be set to be greater, the intake or discharge pumping capacity can be freely set in accordance with the mode of use of the mechanical seal.

Also, according to the fifteenth through seventeenth aspects, because the discharge capacity of the discharge pumping parts can be set to be greater than the intake capacity of the intake pumping parts, the sealed fluid flowing in from the intake pumping parts and elsewhere is returned to the sealed fluid side from the discharge pumping parts and is prevented from leaking out to the atmosphere side.

(6) According to the eighteenth aspect, the sealed fluid can be more readily introduced to the pumping parts, and an antifouling effect is exhibited. Furthermore, providing a hydrophilic coating to the pumping parts and preventing the occurrence of sediment matter leads to the prevention of leakage.

(7) According to the nineteenth aspect, it is even further possible to prevent the sealed fluid from leaking out to the atmosphere side.

BRIEF DESCRIPTION OF DRAWINGS

FIG. 4A is an enlarged plan view of the main parts and FIG. 4B is a cross-sectional view along the X-X line in FIG. 4A;

FIG. 8 is a plan view depicting another example of the pumping parts as in a fourth embodiment of the present invention, and depicts an exemplary case where the sealed-fluid-accommodating blocks and pumping parts are formed on the sealing face of the fixed ring, which, of the sealing faces of the fixed ring and the rotating ring, has the lesser width in the radial direction;

FIG. 9 is a plan view depicting another example of the pumping parts as in a fifth embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction;

FIG. 12 is a cross-sectional view depicting a variety of examples of the pumping parts and sealing faces as in the seventh embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction;

FIG. 13 is a cross-sectional view depicting a variety of examples of the pumping parts and sealing faces as in the seventh embodiment of the present invention, and illustrates an exemplary case where the sealed-fluid-accommodating blocks and pumping parts are formed on the sealing face of the rotating ring, which, of the sealing faces of the fixed ring and the rotating ring, has the greater width in the radial direction;

FIG. 16 is a drawing describing Prior Art 3.

DESCRIPTION OF EMBODIMENTS

Modes for implementing the mechanical seal as in the present invention shall now be described in greater detail with reference to the accompanying drawings. However, the present invention is not to be interpreted as being limited thereto; a variety of modifications, adjustments, or improvements could be added on the basis of the knowledge of a person skilled in the art, provided that no departure is made from the scope of the present invention.

Figure 1:
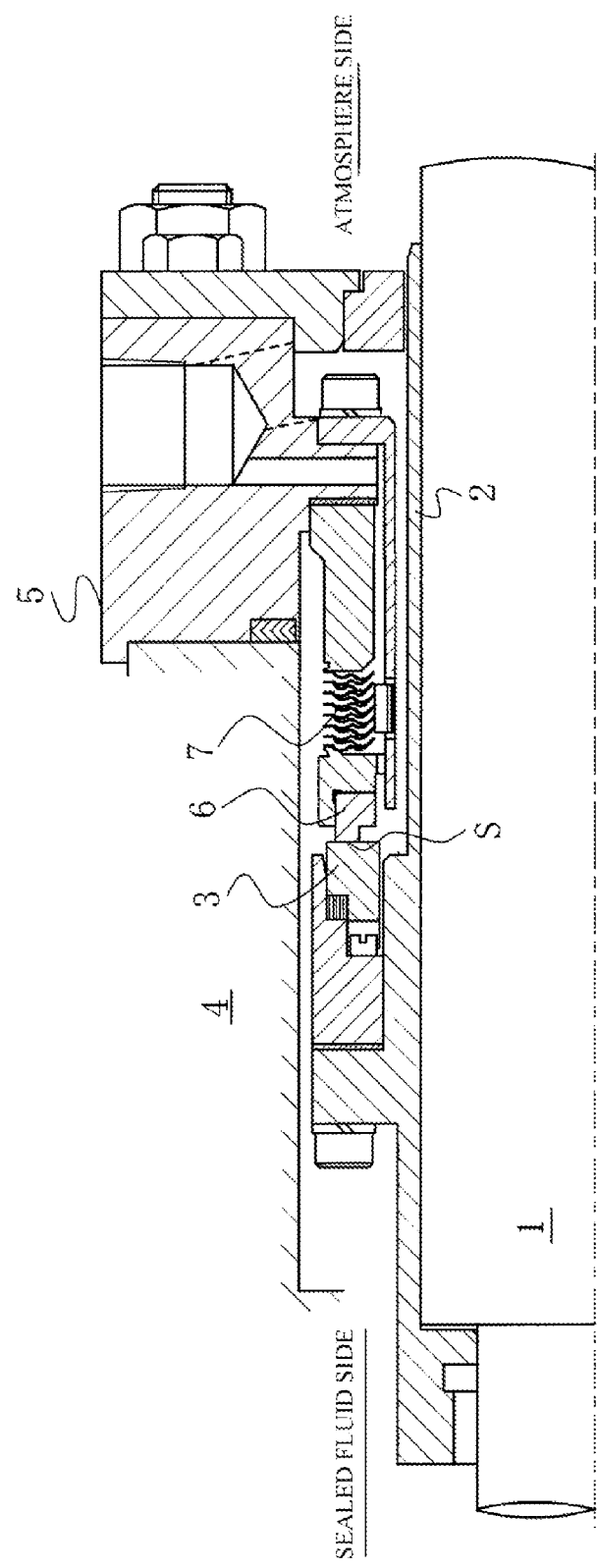
FIG. 1 is a front cross-sectional view illustrating an example of a mechanical seal for general industrial machinery.

FIG. 1 is a front cross-sectional view illustrating an example of a mechanical seal for general industrial machinery.

The mechanical seal in FIG. 1 is of the inside type, which is a type for sealing in a sealed fluid attempting to leak out from an outer periphery of a sealing face toward the inner peripheral direction. An annular rotating ring 3, which is provided closer to a rotating shaft 1 for driving a pump impeller (not shown) on a sealed fluid side, with a sleeve 2 therebetween, in a state permitting rotation in an integral fashion with the rotating shaft 1; and a stationary ring 6 provided to a seal cover 5 fixed to a housing 4 of a pump in a non-rotating state and in a state permitting movement in the axial direction are made to slide in close contact on sealing faces S that have been mirror-finished using lapping or another technique, by a bellows 7 for urging the fixed ring 6 in the axial direction. More specifically, the mechanical seal is intended to prevent the sealed fluid from flowing out from the outer periphery of the rotating shaft 1 toward the atmosphere side on sealing faces S of each of the rotating ring 3 and the fixed ring 6.

The rotating ring 3 and the fixed ring 6 are typically formed from SiC (a hard material) or using a combination of SiC (a hard material) and carbon (a soft material), but sliding materials that are used for mechanical seals could also be applied. "SiC" includes a sintered compact for which boron, aluminum, carbon, or the like has been used as a sintering auxiliary, referring to materials comprising two or more types of phases of different ingredients or components, e.g., SiC having graphite particles dispersed therein, reaction-sintered SiC comprising SiC and Si, SiC—TiC, SiC—TiN, or the like. "Carbon" includes carbonaceous/graphitic carbon mixtures, for which it would be possible to use resin-molding carbon, sintered carbon, or the like. In addition to these sliding materials, it would also be possible to apply a metallic material, resin material, a surface-modified material (coating material), composite material, or the like.

Figure 2:
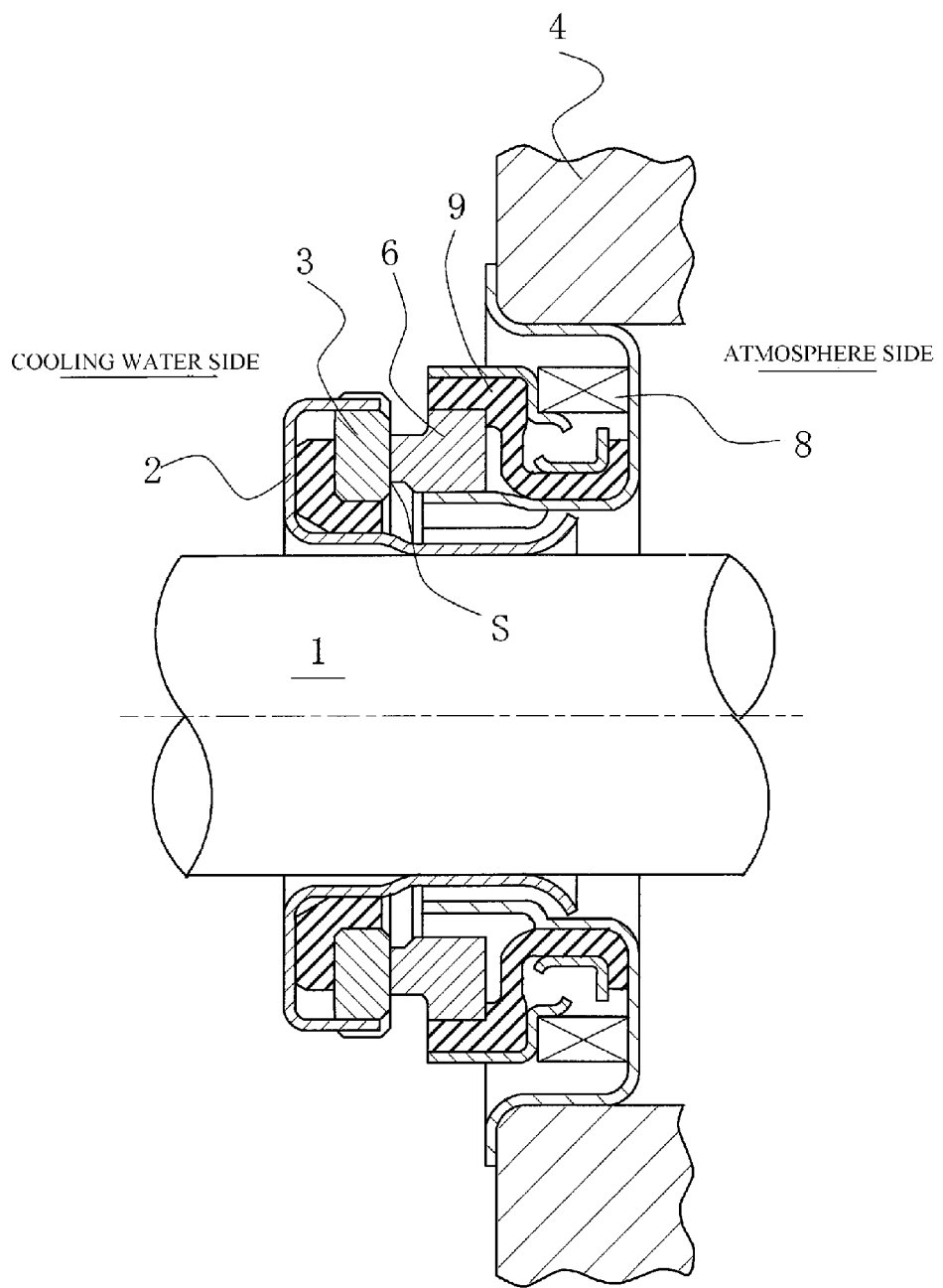
FIG. 2 is a front cross-sectional view illustrating an example of a mechanical seal for a water pump.

FIG. 2 is a front cross-sectional view illustrating an example of a mechanical seal for a water pump.

The mechanical seal in FIG. 2 is of the inside type, which is a type for sealing in cooling water attempting to leak out from an outer periphery of a sealing face toward the inner peripheral direction. An annular rotating ring 3, which is provided closer to a rotating shaft 1 for driving a pump impeller (not shown) on a cooling water side, interposed by a sleeve 2, in a state permitting rotation in an integral fashion with the rotating shaft 1; and a stationary ring 6 provided to a housing 4 of a pump in a non-rotating state and in a state permitting movement in the axial direction are made to slide in close contact on sealing faces S that have been mirror-finished using lapping or another technique, by a coiled wave spring 8 and a bellows 9 which urge the fixed ring 6 in the axial direction. More specifically, the mechanical seal is intended to prevent the cooling water from flowing out from the outer periphery of the rotating shaft 1 toward the atmosphere side on the sealing faces S of each of the rotating ring 3 and the fixed ring 6.

First Embodiment

Figure 3:
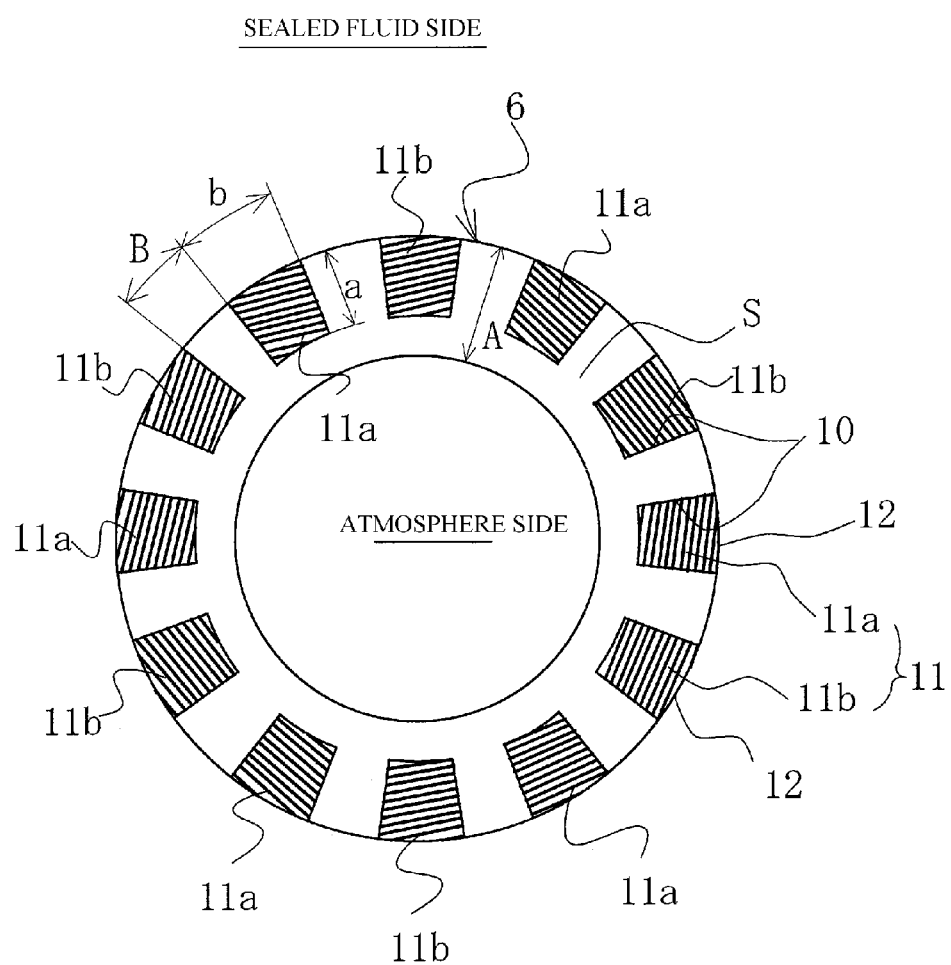
FIG. 3 is a plan view illustrating a mechanical seal as in a first embodiment of the present invention, as exemplified in FIGS. 1 and 2, wherein in this case the sealed-fluid-accommodating blocks and pumping parts are formed on the sealing face of the fixed ring, which, of the sealing faces of the fixed ring and the rotating ring, has the lesser width in the radial direction.

FIG. 3 is a plan view illustrating a mechanical seal as in a first embodiment of the present invention, as exemplified in FIGS. 1 and 2, wherein the first embodiment illustrates a case where sealed-fluid-accommodating blocks and pumping parts are formed on the sealing face S of the fixed ring 6, which, of the sealing faces of the fixed ring 6 and the rotating ring 3, has the lesser width in the radial direction.

In FIG. 3, a plurality of sealed-fluid-accommodating blocks 10 separated in the circumferential direction are formed on the sealing face S of the fixed ring 6 so as to be a part of the sealing face S in the radial direction and to communicate directly to a sealed fluid accommodation space via an outer peripheral side 12.

In the case of an outside-type mechanical seal, in which the sealed fluid side exists on the inside of the rotating ring 3 and the fixed ring 6, the sealed-fluid-accommodating blocks 10 may also be formed so as to be a part of the sealing face S in the radial direction and to communicate directly to the sealed fluid accommodation space via the inner peripheral side.

The width a of the sealed-fluid-accommodating blocks 10 in the radial direction is set to be about one- to two-thirds of the width A of the sealing face S in the radial direction, and the angular range b of the sealed-fluid-accommodating blocks 10 in the peripheral direction is set to be equal to or slightly greater than an angular range B of the sealing face existing between adjacent sealed-fluid-accommodating blocks 10, 10.

Typically, in order to lower the friction of the mechanical seal, there must be a liquid film of about 0.1-10 μm between the sealing faces, although this depends in part on the temperature and the type of sealed fluid. In order to obtain the liquid film, as described above, the plurality of sealed-fluid-accommodating blocks 10, which stand apart in the circumferential direction, are arranged on the sealing face S, and pumping parts 11 whereby a pumping action arises due to the relative rotation and sliding of the fixed ring 6 and the rotating ring 3 are formed on a bottom part of the plurality of sealed-fluid-accommodating blocks 10. The pumping parts 11 are provided with intake pumping part 11a which acts in a direction in which the sealed fluid is drawn in, and a discharge pumping part 11b which acts in a direction in which the sealed fluid is discharged.

As shall be described in greater detail in FIG. 5 (described below), a plurality of linear irregularities (also called a "periodic structure of linear irregularities" in the present invention) at a constant pitch are formed in parallel with each other on each of the pumping parts 11; the irregularities are minute structures formed, for example, using a femto-second laser.

The term "linear irregularity" as used in the present invention comprises not only rectilinear irregularities but also slightly bent irregularities and curved irregularities which appear during a step for forming rectilinear irregularities.

Figure 4:
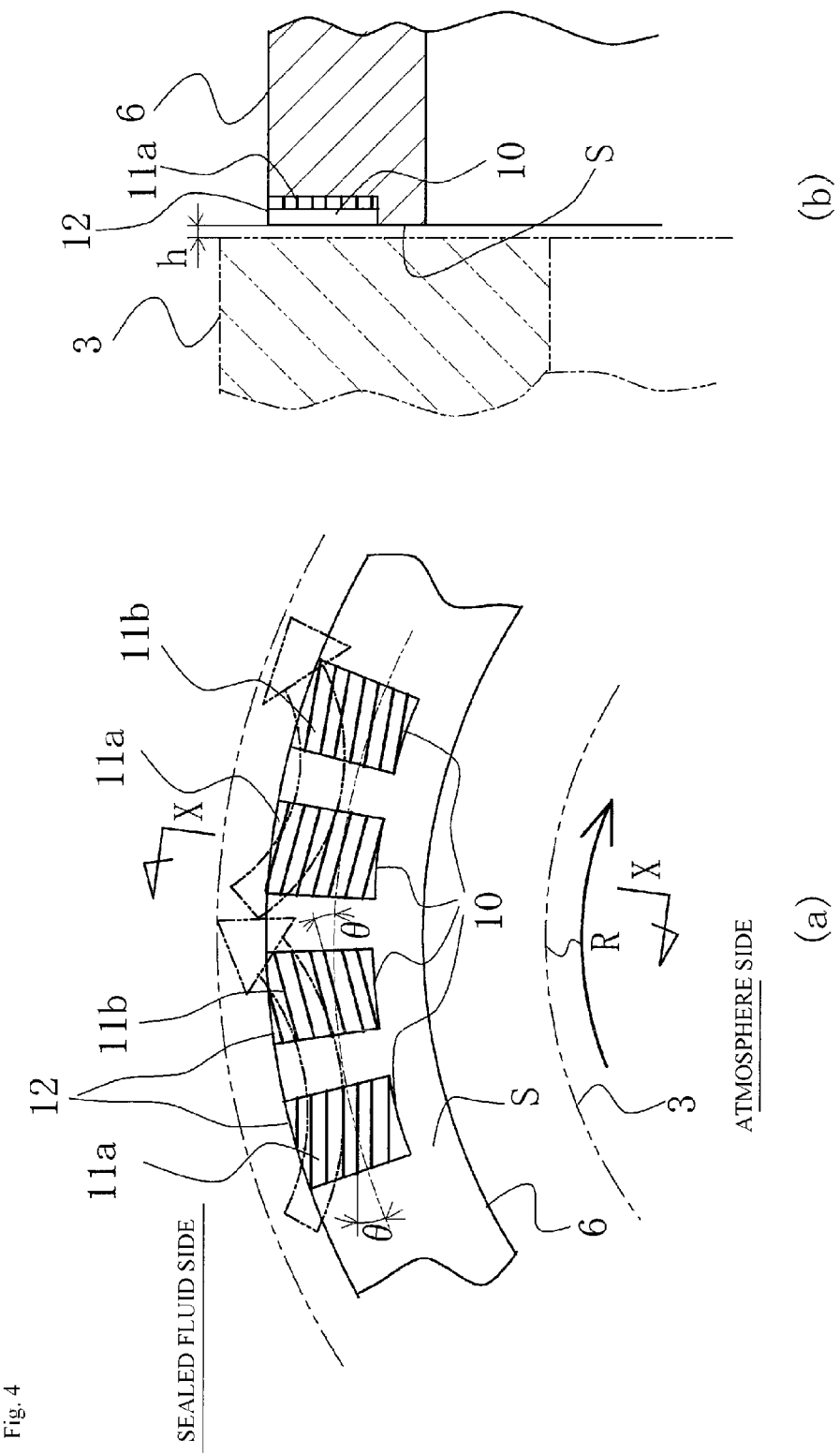
FIG. 4, which depicts the sealed-fluid-accommodating blocks and pumping parts in FIG. 3, illustrates the state during operation, where

FIG. 4, which describes the sealed-fluid-accommodating blocks and pumping parts in FIG. 3, depicts the state during operation, where FIG. 4A is an enlarged plan view of the main parts and FIG. 4B is a cross-sectional view along the X-X line in FIG. 4A.

In FIG. 4, the fixed ring 6 is indicated by a solid line, and the rotating ring 3, which is an opposing sliding member, is indicated by a double-dashed line; the rotating ring 3 rotates in the direction "R."

As illustrated in FIG. 4A, the plurality of sealed-fluidaccommodating blocks 10 are separated by the sealing face S from sealed-fluid-accommodating blocks 10 adjacent in the circumferential direction, and do not communicate with the atmosphere side due to the sealing face S. Also, as illustrated in FIG. 4B, the sealed-fluid-accommodating blocks 10 are formed on a part of the sealing face S in the radial direction, make a concave shape so as to be able to accommodate the sealed fluid, have a step from the sealing face S, and communicate directly with the sealed fluid accommodation space via an outer peripheral side 12.

For this reason, when stationary, there is a state of solid contact between the sealing faces of the fixed ring 6 and the rotating ring 3; therefore, sealing performance is maintained by the sealing faces, which are continuous in the circumferential direction, and the sealed fluid will be caught by the sealed-fluid-accommodating blocks 10 during start-up, as illustrated by the arrow of the double-dashed line in FIG. 4A.

Also, as illustrated in FIG. 4A, the linear irregularities formed on the pumping parts 11 (the drawing illustrates rectilinear irregularities which are representative examples of the linear irregularities; the same applies below) are formed so as to slope at a predetermined angle θ (an angle formed by the tangent line in the case of curved irregularities; the same applies below) with respect to the sliding direction of the sealing face S; i.e., with respect to a rotational tangent line direction of the sealing face S. The predetermined angle θ is preferably in the range of 10 to 80° in both the inner radial direction and outer radial direction with respect to the rotational tangent line of the sealing face S.

The slope angle θ of the linear irregularities of the pumping parts 11 with respect to the rotational tangent line in each of the plurality of sealed-fluid-accommodating blocks 10 may be the same for all or may be different for each pumping part 11. However, because the sliding properties of the sealing face S are influenced in accordance with the slope angle θ, it is more effective for the slope angle of the irregularities of each of the pumping parts 11 to be standardized overall depending on the desired lubrication performance or sliding conditions to a specific, appropriate slope angle θ in order to yield stabilized sliding properties.

The slope angle θ of the irregularities with respect to the rotational tangent line in each of the plurality of pumping parts 11 is therefore restricted to a specific, optimal angle when the rotation and sliding direction of the sealing face S is unidirectional.

When the rotation and sliding direction of the sealing face S is in both forward and reverse directions, then it is preferable for there to be a mixture of first pumping parts, which have irregularities that are sloped with respect to the rotational tangent line by a first angle whereby sliding properties become suitable during rotation in one direction, and second pumping parts, which have irregularities that are sloped with respect to the rotational tangent line by a second angle whereby sliding properties become suitable during rotation in the direction inverse thereto. With a configuration of such description, respectively suitable sliding properties can be obtained when the sealing face S rotates in either of the front or reverse directions.

More specifically, in a case where the sealing face S rotates in both the forward and reverse directions, the irregularities of the intake pumping parts 11a and the discharge pumping parts 11b are preferably formed so that the respective slope angles θ thereof will be angles that are symmetrical with respect to the rotational tangent line.

Also, the intake pumping parts 11a and the discharge pumping parts 11b are preferably formed so as to be arranged in alternation along the peripheral direction of the sealing face S.

The sealing face S illustrated in FIGS. 1 and 2 is a preferred configuration of the sealing face S for a case where the sealing face S of such description is to rotate in two directions.

Also, rather than being arranged in alternation along the peripheral direction of the sealing face S, the intake pumping parts 11a and the discharge pumping parts 11b may instead, for example, be arranged at a ratio of two intake pumping parts 11a for every one discharge pumping part 11b, or alternatively may be arranged at the inverse ratio.

The pumping parts 11, which are a structure (a periodic structure of linear irregularities) where a plurality of linear irregularities at a constant pitch are precisely arranged at a predetermined pitch in parallel with each other, are formed by using, for example, a femtosecond laser to make exact sections in a predetermined region of the sealing face S and to precisely control the direction of the irregularities in each of the sections.

When a substrate is irradiated with a linearly polarized laser at an irradiation intensity in the vicinity of a processing threshold value, interference between incident light and plasma waves or scattered light running along the surface of the substrate forms an irregular-shaped periodic structure having a pitch and groove depth on a wavelength order, in a self-organized fashion orthogonal to the direction of polarization. At this time, the associated periodic structure pattern can be formed on the surface by carrying out the operation while also overlapping the femtosecond laser.

In the periodic structure of linear irregularities of such description made using a femtosecond laser, the directionality thereof can be controlled, and the processing positions can also be controlled, and thus discrete, small sections can be divided and a desired periodic structure can be formed in each of the sections. More specifically, when this method is used while the sealing face of an annular mechanical seal sliding member is caused to rotate, a fine periodic pattern can be selectively formed on the sealing face. Moreover, with a processing method that uses a femtosecond laser, it is possible to form irregularities on a sub-micron order, such irregularities being effective in enhancing the lubrication performance of the mechanical seal and in reducing leakage.

The formation of the sealed-fluid-accommodating blocks 10 and the periodic structure of linear irregularities is not limited to a femtosecond laser; a picosecond laser or electron beam may also be used. Further, the formation of the sealed-fluid-accommodating blocks 10 and the periodic structure of linear irregularities may also be carried out by using a die provided with a periodic structure of linear irregularities to stamp or engrave while also causing the sealing face of the annular mechanical seal sliding member to rotate.

Furthermore, for the formation of the sealed-fluid-accommodating blocks 10 and the periodic structure of linear irregularities, etching may be carried out, followed by the formation of the period structure of linear irregularities on a bottom part of the sealed-fluid-accommodating blocks using a femtosecond laser or the like. A femtosecond laser may also be used to form only the periodic structure of linear irregularities on the sealing face, and thereafter the sealing face where the periodic structure of linear irregularities was not formed may be plated or have a film formed thereon to form the sealed-fluid-accommodating blocks 10.

Figure 5:
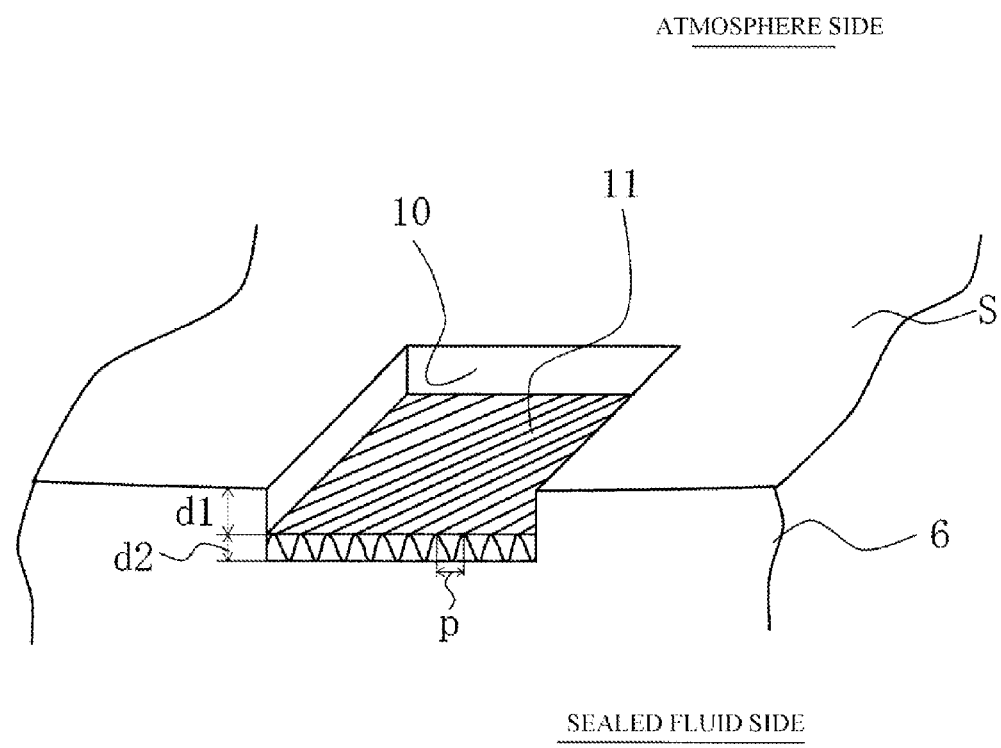
FIG. 5 is a perspective view seen from the sealed fluid side, depicting the sealed-fluid-accommodating blocks and pumping parts in FIGS. 3 and 4.

FIG. 5 is a perspective view seen from the sealed fluid side, which depicts the sealed-fluid-accommodating blocks and pumping parts in FIGS. 3 and 4.

During operation following the start of rotation, a liquid film that is 0.1 to 10 µm thick is formed between the sealing faces of the fixed ring 6 and the rotating ring 3, but in this case, if a virtual plane linking the vertices of the irregularities is drawn in the pumping parts 11, the virtual plane is set to be d1 (0.1 h to 10 h) lower than the sealing face S in accordance with the liquid film h, and the virtual plane is shaped to form a step d1 relative to the sealing face S. The sealed fluid is caught by the space within the sealed-fluid-accommodating blocks 10 formed by this step d1, and an adequate liquid film is formed. However, merely forming an adequate liquid film will result in leakage due to a difference in pressure. For this reason, the pumping parts 11 from which a flow of liquid arises so as to prevent the sealed fluid from leaking out to the atmosphere side are formed on the bottom part of the sealed-fluid-accommodating blocks 10.

In the case where a femtosecond laser is used, the sealed-fluid-accommodating blocks 10 are formed first, after which the pumping parts 11 are formed.

The depth d2 of the vertices and bottom parts of the irregularities is preferably such that d2 is 0.1 h to 10 h.

The pitch p of the linear irregularities of the pumping parts 11 is set in accordance with the viscosity of the sealed fluid, but a range of 0.1-100 µm is preferable. In a case where the sealed fluid is highly viscous, it is better for the pitch p to be sized so as to allow the sealed fluid to adequate enter into the grooves.

In FIG. 5, the pumping parts 11 have been formed in parallel with a plane orthogonal to the shaft in the circumferential direction and the radial direction.

As described above, when stationary, a state of solid contact occurs between the sealing faces of the fixed ring 6 and the rotating ring 3, and therefore leakage is prevented by the sealing face S, which is continuous in the circumferential direction, and sealing performance is thereby maintained. Also, during start-up, the catching of the sealed fluid in the spaces within the sealed-fluid-accommodating blocks 10 makes it possible to quickly form a lubrication fluid film, and lower the sliding torque of the sealing face S and to reduce friction. Also, during operation, the sealed fluid will be caught in the sealed-fluid-accommodating blocks 10 provided with the intake pumping parts 11a, the sealed fluid will be sent in to the sealed-fluid-accommodating blocks 10 provided with the discharge pumping parts 11b located at positions separated by the sealing face S, and the sealed fluid will be returned to the sealed fluid side from the sealed-fluid-accommodating blocks 10 by the action of the discharge pumping parts 11b (see the arrow illustrated with a double-dashed line in FIG. 4A). Through such a flow of the sealed fluid, the lubrication performance of the sealing face S can be ensured, and leakage can be prevented and sealing performance maintained. In particular, setting the virtual plane linking the vertices of the irregularities of the pumping parts 11 to be lower than the sealing face S and having the virtual plane be shaped to have a step d1 from the sealing face S makes it possible to catch the sealed fluid in the space formed by the step during operation and to thereby rapidly form a lubrication fluid film.

Second Embodiment

Figure 6:
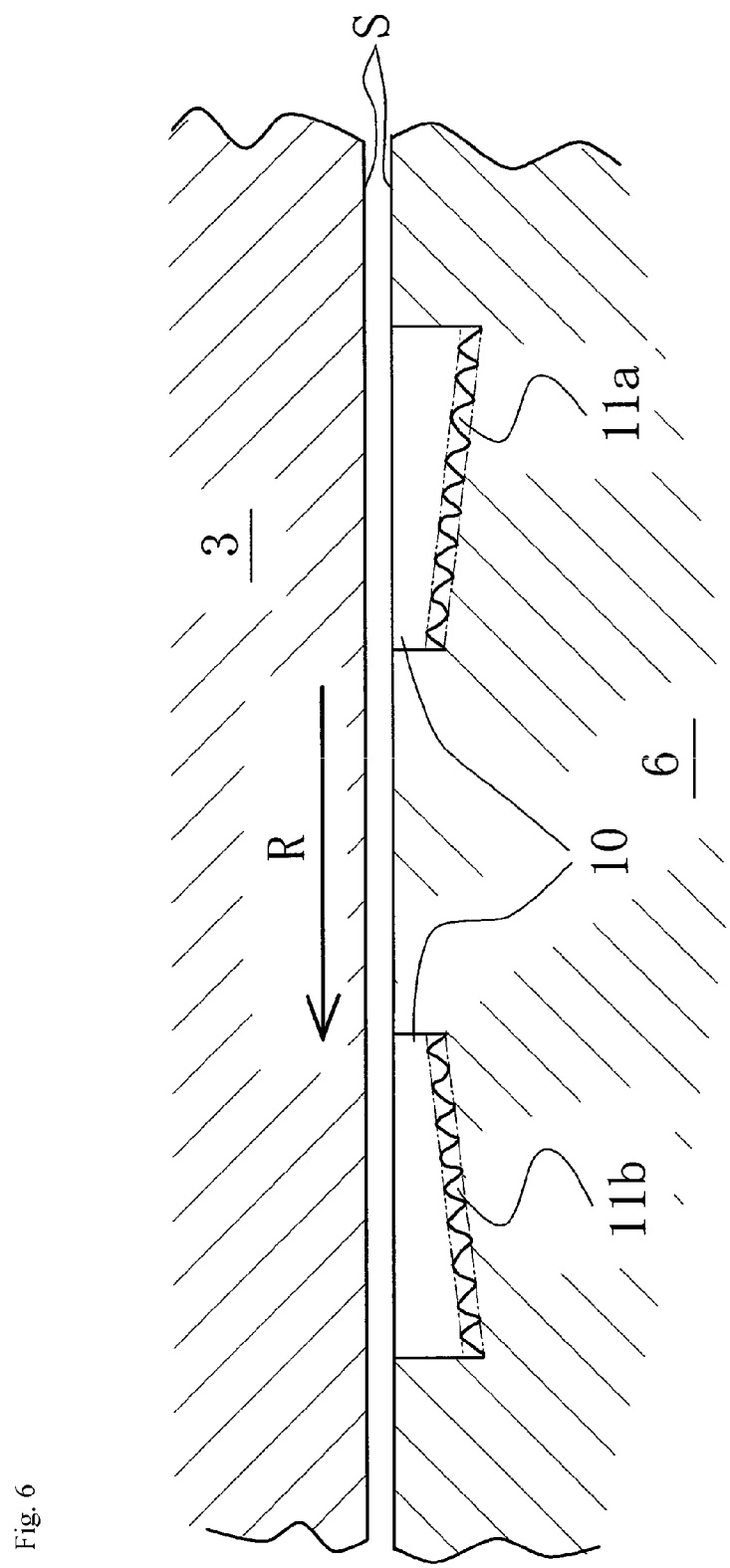
FIG. 6 is a cross-sectional view depicting the sealed-fluid-accommodating blocks and pumping parts formed on a sealing face of a fixed ring of a mechanical seal as in a second embodiment of the present invention, as exemplified in FIGS. 1 and 2, the cross-sectional view being cut by a plane orthogonal to the sealing face.

FIG. 6 is a cross-sectional view illustrating the sealed-fluid-accommodating blocks 10 and pumping parts 11 formed on the sealing face S of the fixed ring 6 of the mechanical seal as in the second embodiment of the present invention, as exemplified in FIGS. 1 and 2.

In the first embodiment, the pumping parts 11 were formed to be parallel to a plane orthogonal to the shaft in the circumferential direction and the radial direction; however, in FIG. 6, the intake pumping parts 11a formed on the bottom part of the sealed-fluid-accommodating blocks 10 are formed so that the linear irregularities thereof gradually become higher toward the direction R of rotation of the rotating ring 3, which is an opposing sliding member; the discharge pumping parts 11b are formed so that the linear irregularities thereof gradually become lower toward the direction R of rotation of the rotating ring 3, which is an opposing sliding member.

In this manner, in addition to the slope with respect to the rotational tangent line when seen from plan view, the linear irregularities are also formed to be sloped in the peripheral direction when seen from a side view as well, and thus it is even further possible in the intake pumping parts 11a for the sealed fluid to be caught and sent to the discharge pumping parts 11b. It is even further possible in the discharge pumping parts 11b for the sealed fluid having been sent therein to be returned to the sealed fluid side.

In the case of the present example, where the liquid film thickness formed between the sealing faces of the fixed ring and the rotating ring is h, then the depth of the deepest part and shallowest part of the virtual plane linking the vertices of the irregularities of the pumping parts, from the sealing face, may be set to fall within the range 0.1 h to 10 h.

The pumping parts 11 formed on the bottom part of the sealed-fluid-accommodating blocks 10 can be sloped as needed, in the circumferential direction and/or the radial direction. For example, in the case where the pumping parts 11 are formed as is illustrated in FIG. 3, the intake pumping parts 11a, being formed so as to gradually become lower toward the inside in the radial direction, will more readily take in the sealed fluid, and the discharge pumping parts 11b, being formed so as to gradually become higher in toward the inside in the radial direction, will more readily discharge the sealed fluid.

In the case of the present example, too, where the liquid film thickness formed between the sealing faces of the fixed ring and the rotating ring is h, then the depth of the deepest part and shallowest part of the virtual plane linking the vertices of the irregularities of the pumping parts, from the sealing face, may be set to fall within the range 0.1 h to 10 h.

Third Embodiment

Figure 7:
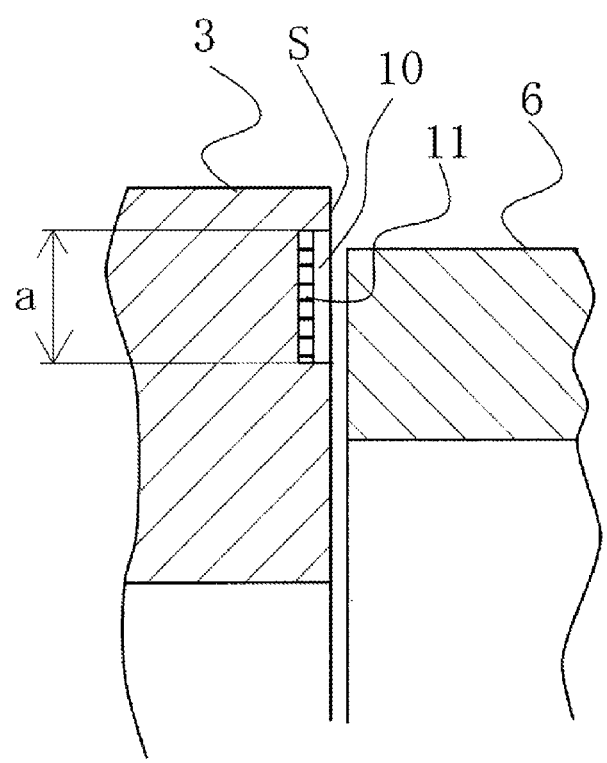
FIG. 7 is a cross-sectional view depicting a mechanical seal as in a third embodiment of the present invention, as exemplified in FIGS. 1 and 2, wherein in this case the sealed-fluid-accommodating blocks and pumping parts are formed on the sealing face of the rotating ring, which, of the sealing faces of the fixed ring and the rotating ring, has the greater width in the radial direction.

FIG. 7 is a plan view illustrating a mechanical seal as in a third embodiment of the present invention, as exemplified in FIGS. 1 and 2, wherein this embodiment is a case where the sealed-fluid-accommodating blocks and pumping parts are formed on the sealing face of the rotating ring, which, of the sealing faces of the fixed ring and the rotating ring, has the greater width in the radial direction.

In FIG. 7, the plurality of sealed-fluid-accommodating blocks 10 separated in the circumferential direction are formed on the sealing face S of the rotating ring 3, which, of the sealing faces of the rotating ring 3 and the fixed ring 6, has the greater sealing face width in the radial direction. The plurality of sealed-fluid-accommodating blocks 10 are formed on a part of the sealing face S that does not include the radial outward and inward sides thereof, and are formed so that a part of the sealed fluid side of the sealed-fluid-accommodating blocks 10 is not covered by the opposing sealing face S of the fixed ring 6. For this reason, the sealing performance when stationary is maintained, and during start-up, the sealed fluid will be caught by the sealed-fluid-accommodating blocks 10.

In the case of an outside-type mechanical seal, in which the sealed fluid side exists on the inside of the rotating ring 3 and the fixed ring 6, the sealed-fluid-accommodating blocks 10 may also be arranged so that a part of the sealed-fluid-accommodating blocks 10 on the inside in the radial direction is not covered by the opposing sealing face of the fixed ring 6.

Fourth Embodiment

FIG. 8 is a plan view describing another example of the pumping parts as in the fourth embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction.

In the case where intake pumping parts 11a and discharge pumping parts 11b of the same capacity are formed on the sealing face S of the mechanical seal, then an advantage emerges in that use with a bidirectionally rotating mechanical seal is possible, but in a case where the sealed fluid is high-pressure, a concern emerges in that the amount of fluid flowing in from the intake pumping parts 11a and elsewhere will surpass the amount of fluid being discharged from the discharge pumping parts 11b, and the amount of leakage will increase.

In FIG. 8A, the pitch Pb of the linear irregularities of the discharge pumping parts 11b is formed to be smaller than the pitch Pa of the linear irregularities of the intake pumping parts 11a, and the discharge capacity of the discharge pumping parts 11b is set to be greater than the intake capacity of the intake pumping parts 11a. For this reason, the sealed fluid flowing in from the intake pumping parts 11a and elsewhere will be discharged from the discharge pumping parts 11b to the sealed fluid side and is prevented from leaking out to the atmosphere side.

Also, in FIG. 8B, the width or depth of the linear irregularities of the discharge pumping parts 11b is formed to be greater than the width or depth of the linear irregularities of the intake pumping parts 11a, and the discharge capacity of the discharge pumping parts 11b is set to be greater than the intake capacity of the intake pumping parts 11a. For this reason, the sealed fluid flowing in from the intake pumping parts 11a and elsewhere is returned to the sealed fluid side from the discharge pumping parts 11b and is prevented from leaking out to the atmosphere side.

Fifth Embodiment

FIG. 9 is a plan view describing another example of the pumping parts as in the fifth embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction.

In the case where intake pumping parts 11a and discharge pumping parts 11b of the same capacity are formed on the sealing face S of the mechanical seal, then an advantage emerges in that use with a bidirectionally rotating mechanical seal is possible, but in a case where the sealed fluid is high-pressure, a concern emerges in that the amount of fluid flowing in from the intake pumping parts 11a and elsewhere will surpass the amount of fluid being discharged from the discharge pumping parts 11b, and the amount of leakage will increase.

In FIG. 9A, the length a of the intake pumping parts 11a and the discharge pumping parts 11b in the peripheral direction is identical, but the length b' of the discharge pumping parts 11b in the radial direction is set to be greater than the length b of the intake pumping parts 11a in the radial direction, and the discharge capacity of the discharge pumping parts 11b is set to be greater than the intake capacity of the intake pumping parts 11a. For this reason, the sealed fluid flowing in from the intake pumping parts 11a and elsewhere is returned to the sealed fluid side from the discharge pumping parts 11b, and is prevented from leaking out to the atmosphere side.

Also, in FIG. 9B, the length b of the intake pumping parts 11a and the discharge pumping parts 11b in the radial direction is identical, but the length a' of the discharge pumping parts 11b in the peripheral direction is formed to be greater than the length a of the intake pumping parts 11a in the peripheral direction, and the discharge capacity of the discharge pumping parts 11b is set to be greater than the intake capacity of the intake pumping parts 11a. For this reason, the sealed fluid flowing in from the intake pumping parts 11a and elsewhere is returned to the sealed fluid side from the discharge pumping parts 11b, and is prevented from leaking out to the atmosphere side.

Additionally, though not depicted, the length of the discharge pumping parts 11b in the peripheral direction or the length thereof in the radial direction may be formed to be greater than the length of the intake pumping parts 11a in the peripheral direction or greater than the length thereof in the radial direction, and the discharge capacity of the discharge pumping parts may be set to be greater than the intake capacity of the intake pumping parts 11a.

Sixth Embodiment

Figure 10:
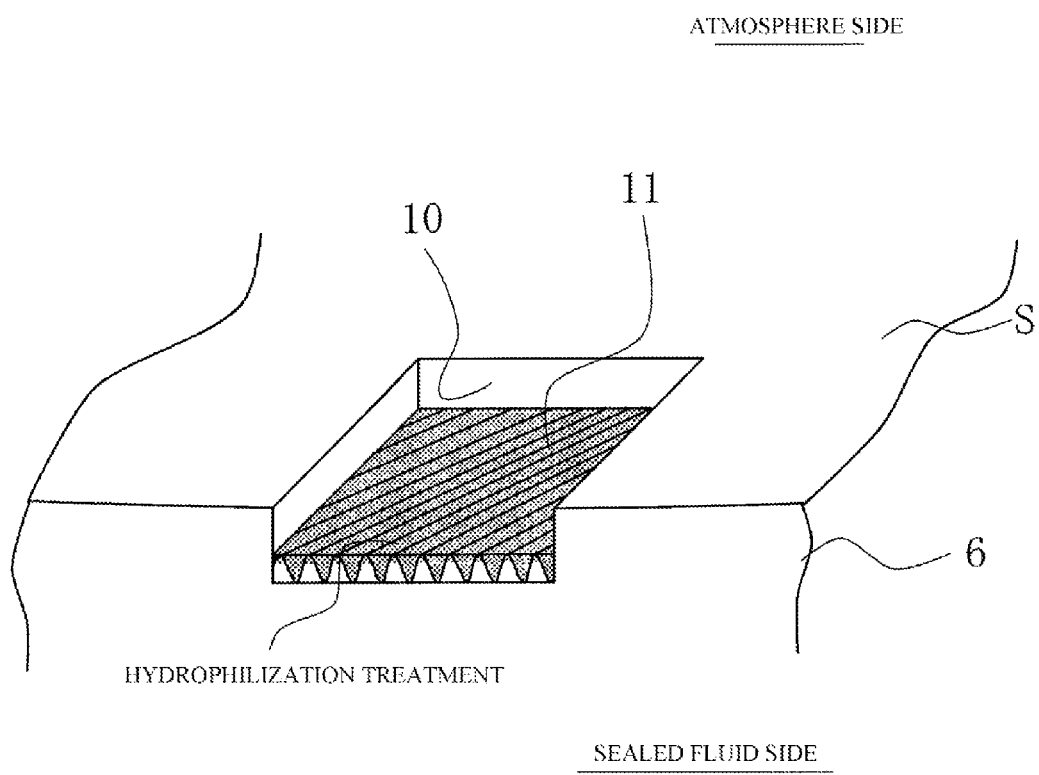
FIG. 10 is a perspective view, seen from the sealed fluid side, depicting another example of the pumping parts as in a sixth embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction.

FIG. 10 is a perspective view, seen from the sealed fluid side, depicting another example of the pumping parts as in the sixth embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction.

Although there is adopted a configuration in which the pumping parts 11 formed on the bottom part of the sealed-fluid-accommodating blocks 10 communicate with the sealed fluid, it is assumed that the sealed fluid of the intake pumping parts 11a is less likely to be drawn in since the sealed-fluid-accommodating blocks 10 are extremely shallow. Also, since the gap of the sealing face S is narrow, the sealed fluid discharged from the intake pumping parts 11a will, when about to flow into the discharge pumping parts 11b, be less likely to do so. It is necessary for the sealed fluid to readily flow into the pumping parts 11 in order for the performance of the pumping parts 11 to be exhibited.

In FIG. 10, a hydrophilization treatment is carried out along the surface of the irregularity parts of the pumping parts 11 (the intake pumping parts 11a and the discharge pumping parts 11b) formed on the bottom part of the sealed-fluid-accommodating blocks 10 and wettability is controlled as a remedial measure so that the sealed fluid will more readily flow into the pumping parts 11.

In FIG. 10, the hatching indicating that the hydrophilization treatment has been carried out may appear to embed the recesses of the pumping parts 11, but is applied over the surface of the irregularity parts, the hydrophilization of the pumping parts 11 being carried out along the surface of the irregularity parts.

Hydrophilization means include:
(1) Hydrophilization by coating with a hydrophilic substance
(2) Hydrophilization by very finely roughening the surface (increasing the irregularity) to increase the surface area
(3) Hydrophilization by a chemical reaction using a photocatalyst (including plasma treatment)

Hydrophilic coating materials in the case of coating with a hydrophilic substance include silica, alumina, zirconia, titania, and other ceramics, or fatty acid esters, fatty acid ethers, sulfuric acid esters, phosphoric acid esters, sulfates, and other organic substances, as well as compounds having a hydrophilic group (a fatty acid, carboxylic acid residue, or the like) on the surface.

The method of coating includes painting, a sol-gel method, plasma treatment, PVD, CVD, shot peening; it would also be possible to use a method that employs a photocatalyst.

In the case where a hydrophilic coating is provided to the pumping parts 11, the sealed fluid is more readily introduced to the pumping parts 11 and an antifouling effect also emerges. Also, because the deposition of sediment matter on the pumping parts leads to leakage, providing the hydrophilic coating and also preventing the occurrence of sediment matter leads to the prevention of leakage.

Seventh Embodiment

Figure 11:
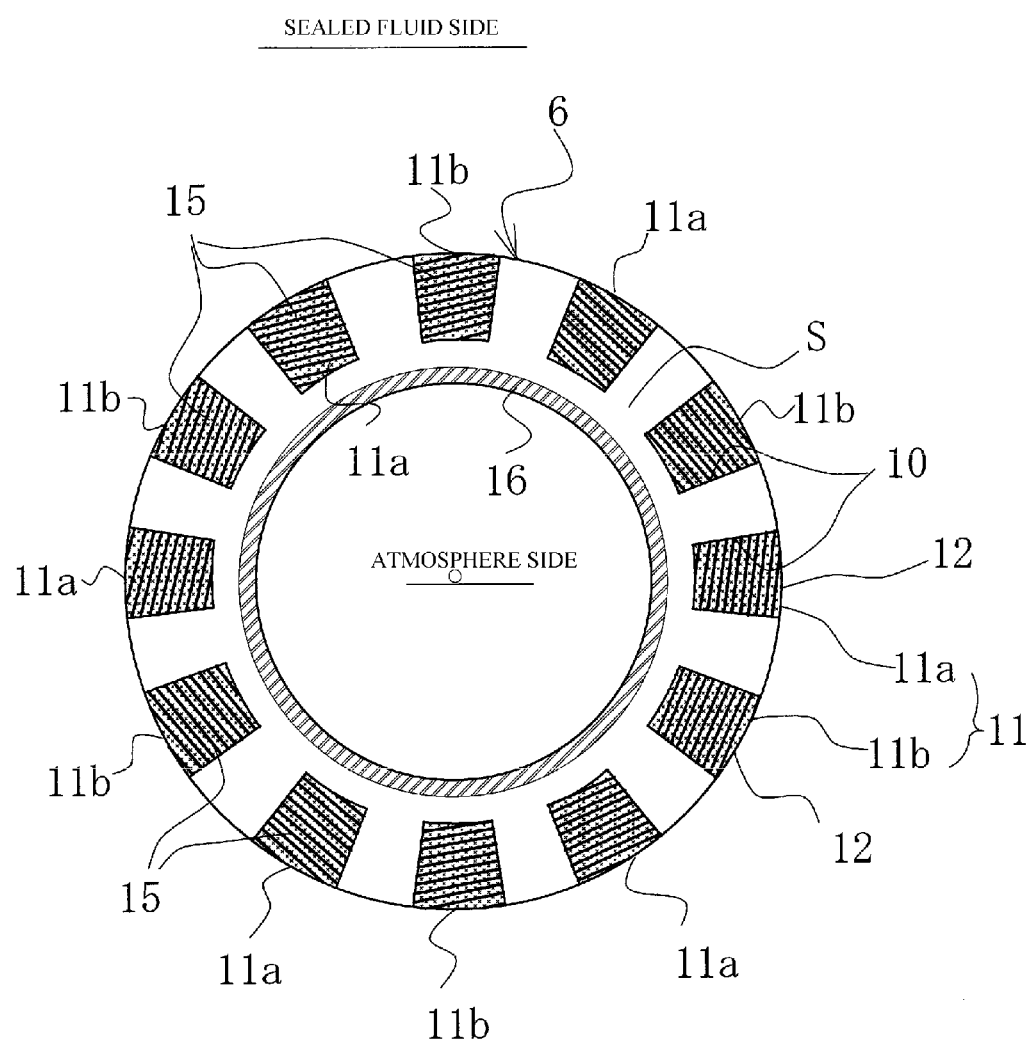
FIG. 11 is a plan view describing another example of the pumping parts and sealing faces as in a seventh embodiment of the present invention, and illustrates an exemplary case where the sealed-fluid-accommodating blocks and pumping parts are formed on the sealing face of the fixed ring, which, of the sealing faces of the fixed ring and the rotating ring, has the lesser width in the radial direction.
Figure 14:
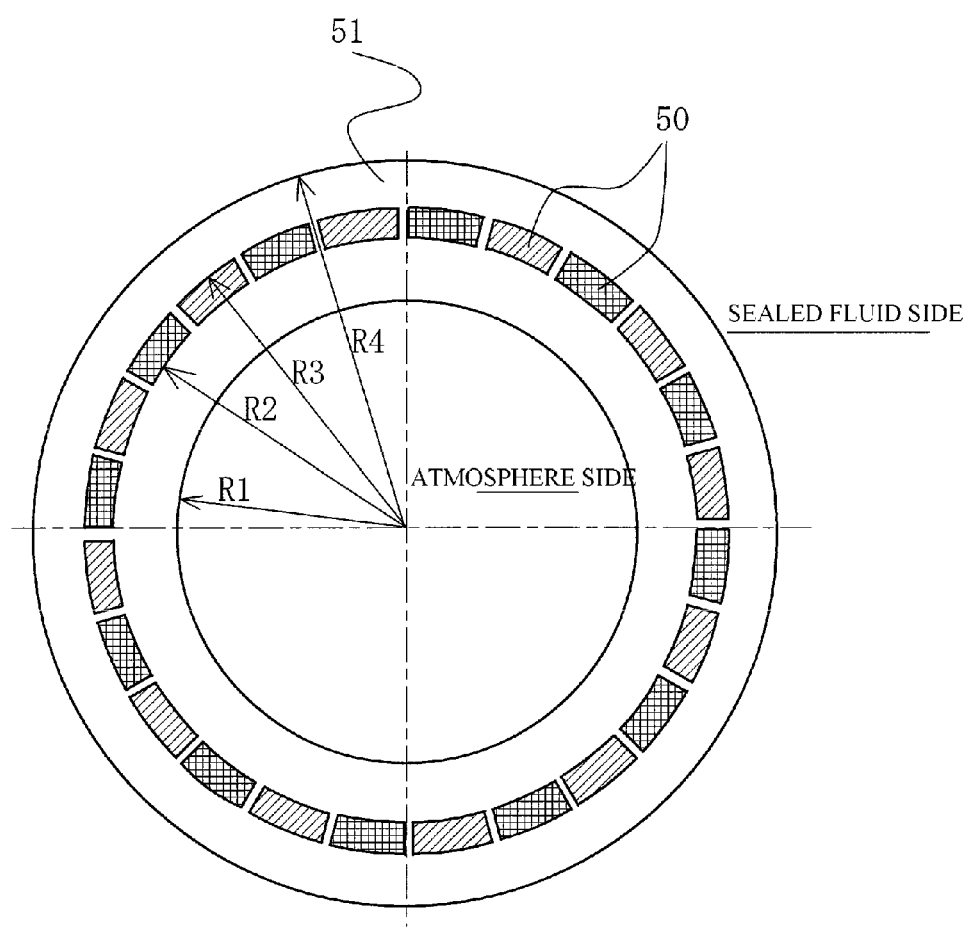
FIG. 14 is a plan view describing Prior Art 1.
Figure 15:
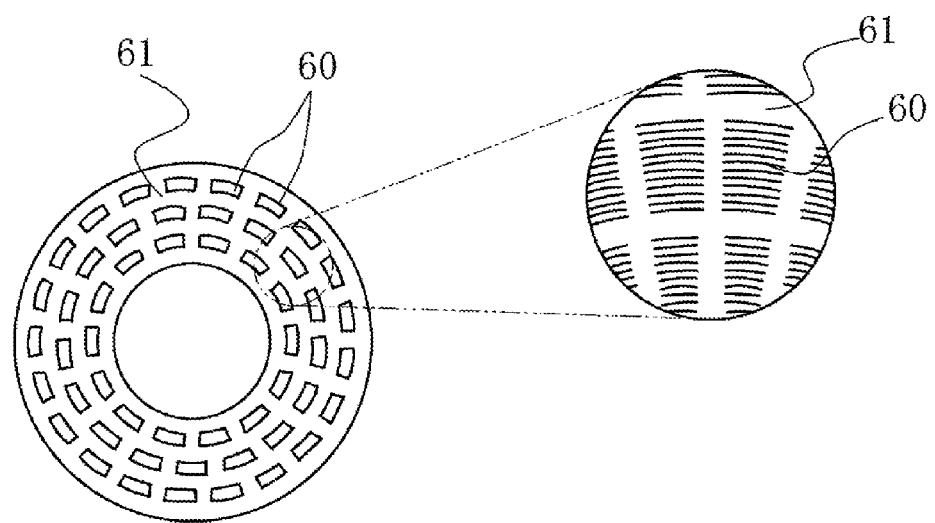
FIG. 15 is a plan view describing Prior Art 2.

There follows a description of a seventh embodiment of the present invention, with reference to FIGS. 11 to 13.

FIG. 11 illustrates an example of a case where the sealed-fluid-accommodating blocks and pumping parts are formed on the sealing face of the fixed ring, which, of the sealing faces of the fixed ring and the rotating ring, has the lesser width in the radial direction. An annular water-repellent coating 16 is provided to the sliding part on the atmosphere side of the sealing face S.

FIG. 11 illustrates a case where the hydrophilic coating 15 illustrated in the sixth embodiment is provided to the pumping parts 11 (to the intake pumping parts 11a and the discharge pumping parts 11b); however, this is not necessarily required, it being readily apparent that the water-repellent coating 16 may also be provided alone.

In the example in FIG. 11, since the intake pumping parts 11a and the discharge pumping parts 11b are hydrophilic, the introduction of sealed fluid is promoted, and the lubrication performance of the sealing face S is improved. In addition the sealed fluid is prevented from leaking to the atmosphere side, since the sliding part on the atmosphere side is water-repellent.

FIG. 12 illustrates a variety of examples of water-repellent coatings for the case where the sealed-fluid-accommodating blocks and pumping parts are formed on the sealing face of the fixed ring, which, of the sealing faces of the fixed ring and the rotating ring, has the lesser width in the radial direction.

In FIG. 12A, the hydrophilic coating 15 is provided to the pumping parts 11, and an annular water-repellent coating 16 is provided to the sliding part on the atmosphere side of the sealing face S to which the pumping parts 11 are provided. A step corresponding to the thickness of the water-repellent coating 16 is formed on the sealing face where the water-repelling coating 16 is provided, but there is no impact on sealing performance provided that the thickness of the water-repellent coating 16 is about the thickness of the liquid film of the sealing face S.

In FIG. 12B, an annular recess from which an amount equivalent to the thickness of the water-repellent coating 16 has been removed is formed on the sliding part on the atmosphere side of the sealing face S where the pumping parts 11 are provided, and the water-repellent coating 16 is provided to the annular recess. For this reason, the sealing face is flush and has no step.

In FIG. 12C, an annular recess from which an amount equal to or greater than the thickness of the water-repellent coating 16 has been removed is formed on the sliding part on the atmosphere side of the sealing face S where the pumping parts 11 are provided, and the water-repellent coating 16 is provided to the annular recess. In this case, the water-repellent coating 16 will not be in contact with the opposing sliding member, but leakage of the sliding fluid can still be adequately prevented provided that there is a gap no greater than 1 μm.

In FIG. 12D, annular recesses from which an amount equivalent to the thickness of the water-repellent coating 16 has been removed are formed on the sliding parts on the atmosphere side of each of the sealing faces S, and the water-repellent coating 16 is provided to the annular recesses. In this case, leakage of the sealed fluid to the atmosphere side is even further prevented.

FIG. 13 illustrates a variety of examples of the water-repellent coating in the case where the sealed-fluid-accommodating blocks and pumping parts are formed on the sealing face of the rotating ring, which, of the sealing faces of the fixed ring and the rotating ring, has the greater width in the radial direction.

In FIG. 13A, the hydrophilic coating 15 is provided to the pumping parts 11, and the annular water-repellent coating 16 is provided to the sliding part on the atmosphere side of the sealing face S, to which the pumping parts 11 are provided. A step in the amount of the thickness of the water-repellent coating 16 is formed on the sealing face where the water-repelling coating 16 is provided, but there is no impact on sealing performance provided that the thickness of the water-repellent coating 16 is about the thickness of the liquid film of the sealing face S.

In FIG. 13B, an annular recess from which an amount equivalent to the thickness of the water-repellent coating 16 has been removed is formed on the sliding part on the atmosphere side of the sealing face S where the pumping parts 11 are provided, and the water-repellent coating 16 is provided to the annular recess. For this reason, the sealing face is flush and has no step.

In FIG. 13C, an annular recess from which an amount equal to or greater than the thickness of the water-repellent coating 16 has been removed is formed on the sliding part on the atmosphere side of the sealing face S where the pumping parts 11 are provided, and the water-repellent coating 16 is provided to the annular recess. In this case, the water-repellent coating 16 will not be in contact with the opposing sliding member, but leakage of the sliding fluid can still be adequately prevented provided that there is a gap no greater than 1 µm.

In FIG. 13D, annular recesses from which an amount equivalent to the thickness of the water-repellent coating 16 has been removed are formed on the sliding parts on the atmosphere side of each of the sealing faces S, and the water-repellent coating 16 is provided to the annular recesses. In this case, leakage of the sealed fluid to the atmosphere side is even further prevented.

The foregoing is a description of embodiments of the present invention, using the accompanying drawings, but the specific configuration is not limited to these embodiments. The present invention also includes any modifications or additions made within a scope that does not depart from the spirit of the present invention.

For example, the fourth and fifth embodiments describe cases where the pumping capacity of the discharge pumping parts is greater than the pumping capacity of the intake pumping parts in the pumping parts formed on the bottom part of the plurality of sealed-fluid-accommodating blocks, but depending on the mode for using the mechanical seal, there are some cases where a certain amount of leakage is acceptable. In such cases, lubrication may be emphasized and the pumping capacity of the intake pumping parts may also be set greater than the pumping capacity of the discharge pumping parts.

REFERENCE SIGNS LIST

1 Rotating shaft
2 Sleeve
3 Rotating ring
4 Housing
5 Seal cover
6 Fixed ring
7 Bellows
8 Coiled wave spring
9 Bellows
10 Sealed-fluid-accommodating block
11 Pumping part
11a Intake pumping part
11b Discharge pumping part
12 Outer peripheral side
15 Hydrophilic coating
16 Water-repellent coating
S Sealing face

The invention claimed is:

1. A mechanical seal for a rotating shaft in which a stationary ring fixed to a fixed side and an annular rotating ring rotating together with a rotating shaft face each other, and annular sealing faces of stationary and rotating rings in a radial direction are made to perform relative rotation, thereby sealing in a sealed fluid present on one side, from the other side, in a radial direction of said sealing faces that slide while undergoing relative rotation, wherein the sealing face of said fixed ring and the sealing face of the rotating ring have different widths in the radial direction, in which one sealing face has a smaller-width sealing face, and the other sealing face has a greater-width sealing face, wherein:

a plurality of sealed-fluid-accommodating recesses separated in the circumferential direction are formed only on the smaller-width sealing face among the smaller-width sealing face and the greater-width sealing face so as to communicate with a sealed fluid accommodation space, with reference to the smaller-width sealing face, each sealed-fluid-accommodating recess has a recess for accommodating the sealed fluid being defined by two side walls extending in the radial direction, one circumferential wall connecting the two side walls on an other side of the sealing faces, and a depressed bottom part connecting bottoms of the two side walls and the one circumferential wall, said depressed bottom part extending from the bottom of the one circumferential wall in the radial direction along the bottoms of the two side walls, wherein a side of the recess on the sealed fluid side opposite to the one circumferential wall in the radial direction has no wall and is open to the sealed fluid accommodation space so as to communicate directly with the sealed fluid accommodation space via the open side of the recess, wherein a width of each sealed-fluid-accommodating recess in the radial direction is one-to two-thirds the width of the smaller-width sealing face in the radial direction, and the angular range of the seal-fluid-accommodating recesses in a peripheral direction is equal to or greater than an angular range of the sealing face existing between adjacent sealed-fluid-accommodating recesses;

each depressed bottom part having, as a pumping part, linear irregularities having vertices for creating a pumping action due to the fixed ring and the rotating ring sliding while undergoing relative rotation, wherein all the vertices of the linear irregularities of each pumping part extend on a virtual plane which is set lower than the smaller-width sealing face, and the linear irregularities are open in the radial direction to the sealed fluid accommodation space so as to communicate directly with the sealed fluid accommodation space via the open side of the linear irregularities;

a liquid film thickness formed between the sealing faces of said fixed ring and rotating ring is h, then the depth d1 of a virtual plane linking the vertices of the irregularities of the pumping parts, from the sealing face, is set so that d1 is 0.1 h to 10 h, and a depth of d2 of the irregularities of the pumping parts is set so that d2 is 0.1 h to 10 h for ideal pumping, wherein the pumping parts constituting the bottom parts of said plurality of sealed-fluid-accommodating recesses are composed of an intake pumping part which acts in a direction in which the sealed fluid is drawn in and a discharge pumping part which acts in a direction in which the sealed fluid is discharged; and when stationary, a state of solid contact occurs between sealing faces of the stationary ring and the rotating ring, in a continuous circumferential direction, whereby sealing performance is maintained.

2. The mechanical seal as set forth in claim 1, wherein:
said pumping parts form a periodic structure of linear irregularities and said linear irregularities are formed so that the direction of the irregularities is sloped by a predetermined angle with respect to the sliding direction of the sealing face.

3. The mechanical seal as set forth in claim 1, wherein:
the pumping parts formed on the bottom part of said plurality of sealed-fluid-accommodating recesses are formed so that the directions of said linear irregularities of adjacent sealed-fluid-accommodating recesses are symmetrical with respect to the sliding direction of the sealing face.

4. The mechanical seal as set forth in claim 1, wherein:
said sealed-fluid-accommodating recesses and the periodic structure of linear irregularities of the pumping parts are formed by irradiation with a picoseconds or femtosecond laser.

5. The mechanical seal as set forth in claim 1, wherein said sealed-fluid-accommodating recesses and the periodic structure of linear irregularities of the pumping parts are formed by stamping or imprinting.

6. The mechanical seal as set forth in claim 1, wherein:
said sealed-fluid-accommodating recesses are formed by etching, and the periodic structure of linear irregularities of the pumping parts is formed by irradiation with a picosecond or femtosecond laser.

7. The mechanical seal as set forth in claim 1, wherein:
said sealed-fluid-accommodating recesses are formed by plating or film-formation, and the periodic structure of linear irregularities of the pumping parts is formed by irradiation with a picosecond or femtosecond laser.

8. The mechanical seal as set forth in claim 1, characterized in that:
the linear irregularities on said intake pumping parts and discharge pumping parts are formed sloped as desired in the circumferential direction and/or the radial direction in a side view.

9. The mechanical seal as set forth in claim 8, characterized in that:
said intake pumping parts are formed so that the linear irregularities become gradually higher toward the direction of rotation of the opposing sliding member in side view, and the discharge pumping parts are formed so that the linear irregularities become gradually lower toward the direction of rotation of the opposing sliding member in side view.

10. The mechanical seal as set forth in claim 8, characterized in that:
said intake pumping parts are formed so that the linear irregularities become gradually lower toward the inner peripheral direction in side view, and the discharged pumping parts are formed so that the linear irregularities become gradually lower toward the outer peripheral direction in side view.

11. The mechanical seal as set forth in claim 1, characterized in that:
in the pumping parts formed on the bottom part of said plurality of sealed-fluid-accommodating recesses, the pumping capacity of said intake pumping parts and the pumping capacity of the discharge pumping parts are set to be equal, or the pumping capacity of either one is set so as to be greater than the other.

12. The mechanical seal as set forth in claim 2, characterized in that:
in the pumping parts formed on the bottom part of said plurality of sealed-fluid-accommodating recesses, a pitch of the linear irregularities of said discharge pumping parts is formed to be smaller than a pitch of the linear irregularities of the intake pumping parts.

13. The mechanical seal as set forth in claim 2, characterized in that:
in the pumping parts formed on the bottom part of said plurality of sealed-fluid-accommodating recesses, a width or the depth of the linear irregularities of said discharge pumping parts is formed to be greater than a width or the depth of the linear irregularities of the intake pumping parts.

14. The mechanical seal as set forth in claim 1, characterized in that:
in the pumping parts formed on the bottom part of said plurality of sealed-fluid-accommodating recesses, a length of said discharge pumping parts in the radial direction or a length of said discharge pumping parts in the circumferential direction is formed to be greater than a length of the intake pumping parts in the radial direction or a length of the intake pumping parts in the circumferential direction.

15. The mechanical seal as set forth in claim 1, characterized in that:
a hydrophilization treatment is carried out on the pumping parts formed on the bottom part of said plurality of sealed-fluid-accommodating recesses.

16. The mechanical seal as set forth in claim 1, characterized in that:
of the sliding parts on a atmosphere side of the sealing faces of said fixed ring and rotating ring, a water-repellency treatment is carried out at least on the sliding part on the atmosphere side of the sealing face where the pumping parts are formed.

17. The mechanical seal as set forth in claim 1, wherein the linear irregularities of each pumping part extend in a direction inclined with reference to the sliding direction of the sealing face.

18. The mechanical seal as set forth in claim 1, wherein the pumping parts are composed of two intake pumping parts for each discharge pumping part.

19. The mechanical seal as set forth in claim 1, wherein the pumping parts are composed of two discharge pumping parts for each intake pumping part.

\* \* \* \* \*